US011296841B2

(12) United States Patent
Liu et al.

(10) Patent No.: US 11,296,841 B2
(45) Date of Patent: Apr. 5, 2022

(54) COMMUNICATIONS METHOD AND APPARATUS

(71) Applicant: HUAWEI TECHNOLOGIES CO., LTD., Guangdong (CN)

(72) Inventors: Xing Liu, Shenzhen (CN); Qufang Huang, Shanghai (CN); Qinghai Zeng, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 40 days.

(21) Appl. No.: 16/943,646

(22) Filed: Jul. 30, 2020

(65) Prior Publication Data

US 2020/0358570 A1 Nov. 12, 2020

Related U.S. Application Data

(63) Continuation of application No. PCT/CN2019/074195, filed on Jan. 31, 2019.

(30) Foreign Application Priority Data

Jan. 31, 2018 (CN) .......................... 201810097512.2

(51) Int. Cl.
*H04L 5/00* (2006.01)
(52) U.S. Cl.
CPC .................................. *H04L 5/0044* (2013.01)
(58) Field of Classification Search
CPC ..... H04L 5/0044; H04L 69/22; H04L 69/324; H04W 28/065; H04W 76/11; H04W 80/02
See application file for complete search history.

(56) References Cited

U.S. PATENT DOCUMENTS

| 2004/0146067 A1* | 7/2004 | Yi ........................... H04L 69/26 370/474 |
| 2009/0175259 A1* | 7/2009 | Lucky ................... H04W 28/06 370/349 |

(Continued)

FOREIGN PATENT DOCUMENTS

| CN | 1711725 A | 12/2005 |
| CN | 101047484 A | 10/2007 |

(Continued)

OTHER PUBLICATIONS

Ericsson, Further design aspects of the NR User Plane stack. 3GPP TSG-RAN WG2 Meeting NR ad-hoc, Spokane, USA, 17th Jan. 19, 2017, R2-1700429, 5 pages.

(Continued)

*Primary Examiner* — Khaled M Kassim
(74) *Attorney, Agent, or Firm* — Womble Bond Dickinson (US) LLP

(57) ABSTRACT

This application provides a communications method and apparatus. The method includes: obtaining, by a media access control (MAC) entity, M radio link control (RLC) protocol data units PDUs, where M is an integer greater than or equal to 2; and generating, by the MAC entity, N media access control MAC protocol data units (PDUs) based on a logical channel corresponding to each of the M RLC PDUs, where any two RLC PDUs corresponding to a same logical channel and having consecutive RLC sequence numbers are carried in different MAC PDUs, and N is an integer greater than or equal to 2. Consecutive RLC PDUs are placed into different MAC PDUs, so that a continuous packet loss of a same service can be avoided, and transmission reliability can be improved.

12 Claims, 6 Drawing Sheets

(56) References Cited

U.S. PATENT DOCUMENTS

| | | | | |
|---|---|---|---|---|
| 2009/0185477 | A1* | 7/2009 | Lee | H04L 47/34 |
| | | | | 370/216 |
| 2018/0205808 | A1* | 7/2018 | Yang | H04W 40/00 |
| 2019/0215901 | A1* | 7/2019 | Jiang | H04W 76/11 |
| 2019/0306871 | A1* | 10/2019 | Liu | H04W 72/1263 |
| 2020/0274654 | A1* | 8/2020 | Loehr | H04W 72/1268 |
| 2020/0275519 | A1* | 8/2020 | Sharma | H04W 80/02 |
| 2020/0351040 | A1* | 11/2020 | Kanamarlapudi | H04W 80/02 |

FOREIGN PATENT DOCUMENTS

| | | |
|---|---|---|
| CN | 101166193 A | 4/2008 |
| CN | 104718716 A | 6/2015 |
| CN | 106063324 A | 10/2016 |
| CN | 106465183 A | 2/2017 |
| EP | 3461209 A1 | 3/2019 |
| WO | 2008041189 A2 | 4/2008 |
| WO | 2014025141 A1 | 2/2014 |
| WO | 2017202334 A1 | 11/2017 |
| WO | 2018006674 A1 | 1/2018 |

OTHER PUBLICATIONS

Catt, LCP procedure for NR. 3GPP TSG-RAN WG2 Meeting #97bis, Hangzhou, China, May 15-19, 2017, R2-1704258, 5 pages.

Catt, LCID for MAC SDU. 3GPP TSG-RAN WG2 Meeting #NR AH2, Qingdao, China, 27 Jun. 29, 2017, R2-1706364, 6 pages.

3GPP TR 22.804 V1.0.0 (Dec. 2017);3rd Generation Partnership Project;Technical Specification Group Services and System Aspects;Study on Communication for Automation in Vertical Domains;(Release 16);total 137 pages.

NTT Docomo, Inc., Ericsson, RLC PDU accommodation in multi MAC PDUs. 3GPP TSG-RAN WG2 Meeting #99bis, Prague, Czech, Oct. 9-13, 2017 , R2-1711619, 5 pages.

Huawei, ASUSTeK, HiSilicon, PDCP operation for packet duplication. 3GPP TSG-RAN WG2 #99bis, Prague, Czech Republic, Oct. 9-13, 2017, R2-1710763, 6 pages.

* cited by examiner

400

```
┌─────────────────────────────────────────────────────┐
│ A media access control MAC entity obtains M radio   │  ～ S410
│ link control RLC protocol data units RLC PDUs,      │
│ where M is an integer greater than or equal to 2    │
└─────────────────────────────────────────────────────┘
                           │
┌─────────────────────────────────────────────────────┐
│ The MAC entity generates N MAC PDUs based on a      │
│ logical channel corresponding to each of the M RLC  │  ～ S420
│ PDUs, where any two RLC PDUs corresponding to a     │
│ same logical channel and having consecutive RLC     │
│ sequence numbers are carried in different MAC       │
│ PDUs, and N is an integer greater than or equal to 2│
└─────────────────────────────────────────────────────┘
```

```
┌─────────────────────────────────────────────────────┐
│ A media access control MAC entity obtains M radio   │  ～ S510
│ link control RLC protocol data units RLC PDUs,      │
│ where M is an integer greater than or equal to 2    │
└─────────────────────────────────────────────────────┘
                           │
┌─────────────────────────────────────────────────────┐
│ The MAC entity generates N MAC PDUs based on a      │  ～ S520
│ flow corresponding to each of the M RLC PDUs,       │
│ where any two RLC PDUs corresponding to a same      │
│ flow that are obtained in consecutive order are     │
│ carried in different MAC PDUs, and N is an integer  │
│ greater than or equal to 2                          │
└─────────────────────────────────────────────────────┘
```

FIG. 5

COMMUNICATIONS METHOD AND APPARATUS

CROSS-REFERENCE TO RELATED APPLICATIONS

This application is a continuation of International Application No. PCT/CN2019/074195, filed on Jan. 31, 2019, which claims priority to Chinese Patent Application No. 201810097512.2, filed on Jan. 31, 2018. The disclosures of the aforementioned applications are herein incorporated by reference in their entireties.

TECHNICAL FIELD

This application relates to the communications field, and more specifically, to a communications method and apparatus.

BACKGROUND

Currently, in a process of communication between a network device and user equipment (UE), the network device and the user equipment each may serve as a transmit end device or a receive end device. During resource allocation, the transmit end device usually performs allocation based on a requirement of the receive end device. For example, the transmit end device allocates a large resource based on an amount that is of to-be-sent data and that is reported by the receive end device. The receive end device needs to place different data packets of a same logical channel or even different data packets of different logical channels onto a same resource in order for sending, to improve resource utilization. Behavior of placing a plurality of data packets of a same logical channel together for sending is referred to as concatenation, and behavior of placing data packets of different logical channels together for sending is referred to as multiplexing. Currently, both a concatenation function and a multiplexing function are completed at a MAC layer.

In the prior art, resource utilization can be improved through concatenation, and the receive end device makes, to the greatest extent, full use of a resource allocated by a network device. However, a problem brought by the concatenation is that if two consecutive data packets of a same service are placed on one resource, the two consecutive data packets are both lost if the resource fails to be sent. In addition, to ensure that a probability that two consecutive packets are lost is less than $10^{-13}$, it needs to be ensured that a failure probability corresponding to each resource is less than $10^{-13}$. This requirement is too strict, and a frequency resource cannot be effectively used.

Therefore, a method urgently needs to be provided, to reduce a probability that two consecutive data packets are lost while ensuring resource utilization, so as to reduce impact caused by a loss of the two consecutive data packets on a service, and improve user experience.

SUMMARY

This application provides a communications method and apparatus, to avoid a loss of consecutive data packets of a same service or flow, so as to improve transmission reliability, and improve user experience.

According to a first aspect, a communications method is provided. The method includes: obtaining, by a media access control MAC entity, M radio link control RLC protocol data units RLC PDUs, where M is an integer greater than or equal to 2; and generating, by the MAC entity, N media access control MAC protocol data units MAC PDUs based on a logical channel corresponding to each of the M RLC PDUs, where any two RLC PDUs corresponding to a same logical channel and having consecutive RLC sequence numbers are carried in different MAC PDUs, and N is an integer greater than or equal to 2.

In one embodiment, when a quantity of bits occupied by an RLC PDU is greater than a quantity of bits occupied by a payload part of a MAC PDU into which the RLC PDU is to be placed, a segment of the RLC PDU may be placed based on the quantity of bits occupied by the payload part of the MAC PDU. An RLC sequence number of an RLC PDU obtained after segmentation remains unchanged, to ensure that the RLC PDU and a next RLC PDU that have consecutive RLC sequence numbers are carried in different MAC PDUs.

According to the communications method provided in this embodiment of this application, for example, a transmit end device sends data to a receive end device. In a process in which the MAC entity receives the M RLC PDUs with consecutive RLC sequence numbers from an RLC entity through a logical channel, and generates the MAC PDUs, the MAC entity places RLC PDUs of each logical channel that have consecutive RLC sequence numbers into different MAC PDUs, to avoid a case in which two consecutive data packets of a same service are concatenated to a same resource, and consequently, the two consecutive data packets of the same service are lost if a transport block fails to be transmitted in a data packet transmission process. This improves transmission reliability and user experience.

With reference to the first aspect, in a first implementation of the first aspect, an interval between MAC sequence numbers of a first MAC PDU and a second MAC PDU in the N MAC PDUs is greater than or equal to k, k is an integer greater than or equal to 2, the first MAC PDU carries a first RLC PDU on a first logical channel, the second MAC PDU carries a second RLC PDU on the first logical channel, and RLC sequence numbers of the first RLC PDU and the second RLC PDU are consecutive.

In an optional implementation, RLC PDUs of a same logical channel that have consecutive RLC sequence numbers are placed into different MAC PDUs, and there is a specific interval between the MAC PDUs for placement. This further reduces a possibility that two consecutive data packets of a same service are concatenated to a same resource, and improves transmission reliability.

With reference to the first aspect and the foregoing implementation of the first aspect, in a second implementation of the first aspect, a third MAC PDU in the N MAC PDUs carries T RLC PDUs corresponding to a same logical channel, T is an integer greater than or equal to 2, T is less than M, an interval between RLC sequence numbers of any two of the T RLC PDUs is greater than or equal to t, and t is an integer greater than or equal to 2.

In the foregoing technical solution, a plurality of RLC PDUs with nonconsecutive RLC sequence numbers are placed into one MAC PDU, to improve resource utilization and improve transmission reliability when sufficient resources are allocated to the logical channel.

In one embodiment, after receiving a transport block, a physical layer divides the transport block into code blocks. A MAC layer needs to learn of a code block segmentation rule of the physical layer. In a process of placing an RLC PDU into a MAC PDU, RLC PDUs of one logical channel that have consecutive RLC sequence numbers are placed into different code blocks according to the segmentation rule. Only one RLC PDU is placed into one code block, or a plurality of RLC PDUs corresponding to a same logical channel and having nonconsecutive RLC sequence numbers are placed into one code block. In addition, each code block includes a MAC subheader corresponding to an RLC PDU. This ensures that after a physical layer at a receive end receives all code blocks, each code block can be successfully decoded, and can be directly delivered to the MAC layer, to ensure a quick transmission response.

According to a second aspect, a communications method is provided. The method includes: obtaining, by a media access control MAC entity, M radio link control RLC protocol data units RLC PDUs, where M is an integer greater than or equal to 2; and generating, by the MAC entity, N MAC PDUs based on a flow corresponding to each of the M RLC PDUs, where any two RLC PDUs corresponding to a same flow that are obtained in consecutive order are carried in different MAC PDUs, and N is an integer greater than or equal to 2.

In one embodiment, when a quantity of bits occupied by an RLC PDU is greater than a quantity of bits occupied by a payload part of a MAC PDU into which the RLC PDU is to be placed, a segment of the RLC PDU may be placed based on the quantity of bits occupied by the payload part of the MAC PDU. An RLC sequence number of an RLC PDU obtained after segmentation remains unchanged, to ensure that the RLC PDU and a next consecutive RLC PDU are carried in different MAC PDUs.

According to the communications method provided in this embodiment of this application, for data packets from a same flow (quality of service flow, QoS flow) that are obtained in consecutive order, in a process in which the MAC entity obtains the M RLC PDUs of the same QoS flow, and generates the MAC PDUs, the MAC entity places RLC PDUs of the same QoS flow that are obtained in consecutive order into different MAC PDUs, to avoid a case in which two consecutive data packets that belong to the same QoS flow are concatenated to a same resource, and consequently, the two consecutive data packets are lost if a transport block fails to be transmitted in a data packet transmission process. This improves transmission reliability and user experience.

With reference to the second aspect, in a first implementation of the second aspect, an interval between MAC sequence numbers of a first MAC PDU and a second MAC PDU in the N MAC PDUs is greater than or equal to k, k is an integer greater than or equal to 2, the first MAC PDU carries a first RLC PDU of a first flow, the second MAC PDU carries a second RLC PDU of the first flow, and the first RLC PDU and the second RLC PDU are obtained in consecutive order.

In an optional implementation, RLC PDUs of a same QoS flow that are obtained in consecutive order are placed into different MAC PDUs, and there is a specific interval between the MAC PDUs for placement. This further reduces a possibility that two consecutive data packets are concatenated to a same resource, and improves transmission reliability.

With reference to the second aspect and the foregoing implementation of the second aspect, in a second implementation of the second aspect, a third MAC PDU in the N MAC PDUs carries T RLC PDUs corresponding to a same flow, and T is an integer greater than or equal to 2. In addition, any two of the T RLC PDUs are not obtained in order, and t−1 RLC PDUs corresponding to a same flow are further obtained between obtaining moments of the two RLC PDUs, where t is an integer greater than or equal to 2.

In the foregoing technical solution, a plurality of RLC PDUs that are obtained in nonconsecutive order are placed into one MAC PDU, to improve resource utilization and improve transmission reliability.

With reference to the second aspect and the foregoing implementations of the second aspect, in a third implementation of the second aspect, the generating, by the MAC entity, N MAC PDUs based on a flow corresponding to each of the M RLC PDUs includes: determining, by the MAC entity based on a flow identifier carried in each RLC PDU, the flow corresponding to each of the M RLC PDUs, where the flow identifier is carried in a service data adaptation protocol SDAP header or a packet data convergence protocol PDCP header.

In one embodiment, when an SDAP PDU is generated at an SDAP layer by using a data packet, the SDAP layer adds an SDAP header to the data packet, and the MAC layer determines, based on the encapsulated SDAP header, a flow identifier carried in an RLC PDU corresponding to each SDAP PDU, to determine a flow corresponding to the M RLC PDUs. Then, the flow corresponding to the M RLC PDUs is identified, and two data packets of a same QoS flow that are obtained in consecutive order are prevented from being concatenated to a same resource, to improve transmission reliability.

In one embodiment, in a process of adding a PDCP header, a PDCP layer adds an indicator field to a data packet to indicate a flow ID. The MAC entity reads the PDCP header to determine a QFI indicated by the indicator field, and then identify the flow corresponding to the M RLC PDUs.

According to a third aspect, a communications method is provided. The method includes: obtaining, by a media access control MAC entity, M radio link control RLC protocol data units RLC PDUs, where M is an integer greater than or equal to 2; and generating, by the MAC entity, N media access control MAC protocol data units MAC PDUs based on a bearer corresponding to each of the M RLC PDUs, where any two RLC PDUs corresponding to a same bearer and having consecutive PDCP sequence numbers are carried in different MAC PDUs, and N is an integer greater than or equal to 2.

One bearer may include M data packets, and the M data packets correspond to M PDCP PDUs at a PDCP layer. A PDCP entity adds a PDCP sequence number to a header of each PDCP PDU in order. In this case, each of the M PDCP PDUs has a different PDCP sequence number. Then, the PDCP PDUs correspond to the M RLC PDUs formed at an RLC layer, and a payload of each RLC PDU includes a unique PDCP sequence number. To avoid a continuous packet loss of a same bearer, at a MAC layer, RLC PDUs that are of a same bearer and that have consecutive PDCP sequence numbers are placed on different resources for transmission. To achieve the foregoing objective, before generating the N MAC PDUs, the MAC layer needs to identify M PDCP PDUs that belong to a same bearer and that have consecutive PDCP sequence numbers in a plurality of RLC PDUs.

In one embodiment, when a quantity of bits occupied by an RLC PDU is greater than a quantity of bits occupied by a payload part of a MAC PDU into which the RLC PDU is to be placed, a segment of the RLC PDU may be placed based on the quantity of bits occupied by the payload part of the MAC PDU. An RLC sequence number of an RLC PDU obtained after segmentation remains unchanged, to ensure that the RLC PDU and a next RLC PDU that have consecutive RLC sequence numbers are carried in different MAC PDUs.

According to the communications method provided in this embodiment of this application, for example, a transmit end device sends data to a receive end device, and the MAC layer reads a PDCP sequence number of a data packet at the PDCP layer in a cross-layer manner. In a process in which the MAC entity obtains M RLC PDUs with consecutive PDCP sequence numbers from a same bearer, and generates MAC PDUs, the MAC entity places RLC PDUs of each bearer that have consecutive PDCP sequence numbers into different MAC PDUs, to avoid a case in which two consecutive data packets of a same service are concatenated to a same resource, and consequently, the two consecutive data packets of the same service are lost if a transport block fails to be transmitted in a data packet transmission process. This improves transmission reliability and user experience.

With reference to the third aspect, in a first implementation of the third aspect, an interval between MAC sequence numbers of a first MAC PDU and a second MAC PDU in the N MAC PDUs is greater than or equal to k, k is an integer greater than or equal to 2, the first MAC PDU carries a first RLC PDU of a first bearer, the second MAC PDU carries a second RLC PDU of the first bearer, and PDCP sequence numbers of the first RLC PDU and the second RLC PDU are consecutive.

In an optional implementation, RLC PDUs of a same bearer that have consecutive PDCP sequence numbers are placed into different MAC PDUs, and there is a specific interval between the MAC PDUs for placement. This further reduces a possibility that two consecutive data packets of a same service are concatenated to a same resource, and improves transmission reliability.

With reference to the third aspect and the foregoing implementation of the third aspect, in a second possible implementation of the third aspect, a third MAC PDU in the N MAC PDUs carries T RLC PDUs corresponding to a same bearer, T is an integer greater than or equal to 2, T is less than M, an interval between PDCP sequence numbers of any two of the T RLC PDUs is greater than or equal to t, and t is an integer greater than or equal to 2.

In the foregoing technical solution, a plurality of RLC PDUs with nonconsecutive PDCP sequence numbers are placed into one MAC PDU, to improve resource utilization and improve transmission reliability.

According to a fourth aspect, a communications method is provided. The method includes: obtaining, by a packet data convergence protocol PDCP entity, P data packets, where P is a positive integer greater than or equal to 2; and sending, by the PDCP entity, the P data packets to at least two RLC entities based on a PDCP sequence number of each data packet, where any two data packets with consecutive PDCP sequence numbers in the P data packets are sent to different RLC entities.

With reference to the fourth aspect, in a first implementation of the fourth aspect, H data packets in the P data packets are sent to a first RLC entity in the at least two RLC entities, H is an integer greater than or equal to 2, an interval between PDCP sequence numbers of any two of the H data packets is greater than or equal to h, and h is an integer greater than or equal to 2.

According to the foregoing technical solution, after a PDCP layer completes flow splitting, a MAC layer obtains RLC PDUs through different logical channels, and generates MAC PDUs. To prevent two consecutive data packets of a same service from being placed on a same resource for transmission, during multiplexing at the MAC layer, the following limitation may be imposed: in a process of generating a MAC PDU, the MAC layer cannot place data of at least two logical channels corresponding to a same PDCP entity into the MAC PDU. In other words, an RLC PDU on only one logical channel corresponding to a same PDCP entity can be placed into one MAC PDU.

In one embodiment, when a receive end device is located within coverage of one or more cells (carriers) provided by a macro base station or a small cell, and there are one or more cells that serve the receive end device (for example, UE), at least two logical channels to which data packets of a same service are mapped after the service is split may be mapped to different cells (or cell groups) or carriers (or carrier groups), and a data packet can be transmitted by using a resource of only a corresponding cell (or cell group) or carrier (or carrier group).

In one embodiment, for a same service, when the service is mapped to the PDCP layer at an SDAP layer, data packets with consecutive SDAP sequence numbers may be split to different PDCP entities, and then mapped to different logical channels corresponding to different RLC entities.

According to a fifth aspect, a communications apparatus is provided. The apparatus is configured to perform the method in any one of the first aspect or the implementations of the first aspect, the method in any one of the second aspect or the implementations of the second aspect, the method in any one of the third aspect or the implementations of the third aspect, or the method in any one of the fourth aspect or the implementations of the fourth aspect. Specifically, the communications apparatus may include units configured to perform the method in any one of the first aspect or the implementations of the first aspect, units configured to perform the method in any one of the second aspect or the implementations of the second aspect, units configured to perform the method in any one of the third aspect or the implementations of the third aspect, or units configured to perform the method in any one of the fourth aspect or the implementations of the fourth aspect.

According to a sixth aspect, a communications apparatus is provided, including a memory, a processor, and a transceiver. The transceiver is configured to send and receive data, the memory is configured to store a computer program, and the processor is configured to invoke the computer program from the memory and run the computer program, so that the communications apparatus performs the method in any one of the first aspect or the implementations of the first aspect, the method in any one of the second aspect or the implementations of the second aspect, the method in any one of the third aspect or the implementations of the third aspect, or the method in any one of the fourth aspect or the implementations of the fourth aspect.

According to a seventh aspect, a computer-readable storage medium is provided, configured to store a computer program. The computer program is used to perform the method in any one of the first aspect to the fourth aspect or the implementations of the first aspect to the fourth aspect.

According to an eighth aspect, a computer program product is provided. The computer program product includes computer program code, and when the computer program code is run by a transceiver unit and a processing unit or a transceiver and a processor of a communications apparatus, the communications apparatus is enabled to perform the method in any one of the first aspect to the fourth aspect or the implementations of the first aspect to the fourth aspect.

According to a ninth aspect, a communications system is provided. The communications system includes the apparatus according to the fifth aspect and the apparatus according to the sixth aspect.

BRIEF DESCRIPTION OF DRAWINGS

FIG. 4 is a schematic flowchart of an example of a communications method according to an embodiment of this application;

FIG. 5 is a schematic flowchart of another example of a communications method according to an embodiment of this application;

DESCRIPTION OF EMBODIMENTS

The following describes technical solutions of this application with reference to accompanying drawings.

It should be understood that, the terms "system" and "network" in this specification may usually be used interchangeably. The term "and/or" in this specification describes only an association relationship for describing associated objects and represents that three relationships may exist. For example, A and/or B may represent the following three cases: only A exists, both A and B exist, and only B exists. In addition, the character "/" in this specification usually indicates an "or" relationship between the associated objects.

It should be noted that numbers such as "first" and "second" in the following descriptions are merely used to distinguish between different description objects, for example, to distinguish between different MAC PDU resources (for example, a first MAC PDU resource and a second MAC PDU resource), and RLC PDUs (for example, a first RLC PDU and a second RLC PDU) corresponding to different data packets, and should not be construed as a limitation on the technical solutions in the embodiments of this application.

Figure 1:
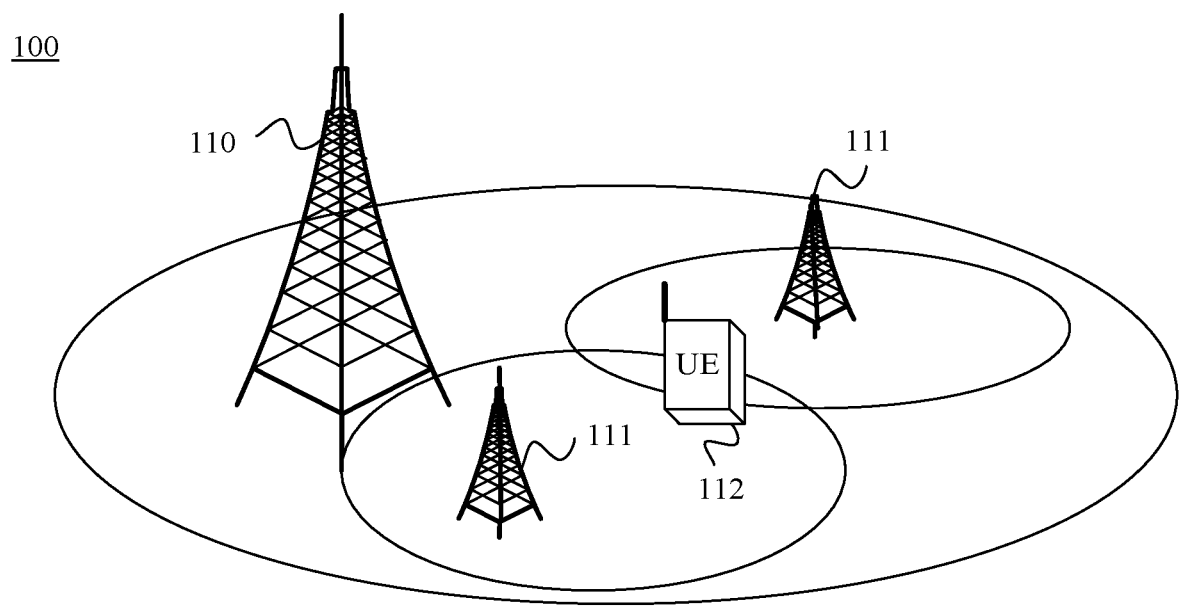
FIG. 1 is an architectural diagram of a wireless communications system according to an embodiment of this application.

FIG. 1 is a schematic diagram of a wireless communications system 100 to which an embodiment of this application is applied. As shown in FIG. 1, the wireless communications system 100 may include one macro base station 110, at least two small cells 111, and at least one user equipment UE 112. The UE 112 is located within coverage of one or more cells (carriers) provided by the macro base station 110 or the small cell 111, and there may be one or more cells that serve the UE 112. When there are a plurality of cells that serve the UE 112, the UE may work in a carrier aggregation (CA) manner, a dual connectivity (DC) manner, or a coordinated multipoint transmission/reception (CoMP) manner. At least one cell provides more than one type of numerology to provide radio resources for the UE at the same time.

The wireless communications system 100 may be a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, a new radio (NR) system, or the like. This is not limited in the embodiments of this application.

The wireless communications system 100 includes a network device such as the macro base station 110 or the small cell 111. The network device may be a device configured to communicate with the user equipment 112. The network device may be a base transceiver station (BTS) in a global system for mobile communications (GSM) or a code division multiple access (CDMA) system, may be a NodeB (NB) in a wideband code division multiple access (WCDMA) system, may be an evolved NodeB (Evolutional NodeB, eNB or eNodeB) in an LTE system, or may be a wireless controller in a cloud radio access network (CRAN) scenario. Alternatively, the transmit end device may be a relay node, an access point (AP), a vehicle-mounted device, a wearable device, a transmit end device in a future 5G network, a transmit end device in a future evolved PLMN network, or the like. This is not limited in the embodiments of this application.

The wireless communications system 100 further includes the UE 112. For example, the UE 112 may be an access device, an access terminal, a subscriber unit, a subscriber station, a mobile station, a mobile console, a remote station, a remote terminal, a mobile device, a user terminal, a terminal, a wireless communications device, a user agent, or a user apparatus. The user equipment may alternatively be a cellular phone, a cordless phone, a session initiation protocol (SIP) phone, a wireless local loop (WLL) station, a sensor having a network access function, a personal digital assistant (PDA), a handheld device having a wireless communication function, a computing device or another processing device connected to a wireless modem, a vehicle-mounted device, a wearable device, a receive end device in a future 5G network, a device in a future evolved public land mobile network (PLMN), or the like. This is not limited in the embodiments of this application.

It should be understood that, in the embodiments of this application, the transmit end device and the receive end device are devices that may be applied to the wireless communications system. Specifically, the transmit end device may be a network device or user equipment, and the receive end device may be a network device or user equipment. It should be understood that, whether the transmit end device or the receive end device is specifically the network device or the user equipment is not limited.

The new radio NR system needs to satisfy a requirement of a deterministic service. The deterministic service is mainly some services related to industrial control. For example, for a type of motion control service, a controller sends, to a group of executors, an instruction of performing a specific action, for example, packing or printing. This type of service has a higher latency requirement than a common broadband service and has a special requirement for reliability. For example, in the 3rd generation partnership project (3GPP) TR22.804, it is pointed out that a probability that two consecutive application-layer data packets have an error needs to be low enough to be ignored, because a machine may be damaged or a product line may be suspended. In addition, during a joint test with a KUKA robot, if a heartbeat packet of KUKA fails to be transmitted two consecutive times, an application-layer connection is disconnected and then reconnected. It can be learned that for a same service, if two consecutive data packets are lost, quality of the service may be severely affected, resulting in poor user experience.

If the foregoing requirement is described by using a quantized language, the requirement is as follows: A transmission failure probability (Block Error Ratio, BLER) of a single application-layer data packet does not exceed $10^{-5}$, and a transmission failure probability such as a BLER of two consecutive data packets needs to be further less than $10^{-13}$. To ensure that a probability such as a BLER that two consecutive data packets are lost is less than $10^{-13}$, it needs to be ensured that a failure probability corresponding to each resource is less than $10^{-13}$. This requirement causes that a transmission reliability requirement and a resource utilization requirement cannot be simultaneously satisfied, and a frequency resource cannot be effectively used. Therefore, a method that can be used to not only ensure transmission reliability but also improve resource utilization is required to implement data packet transmission.

Figure 2:
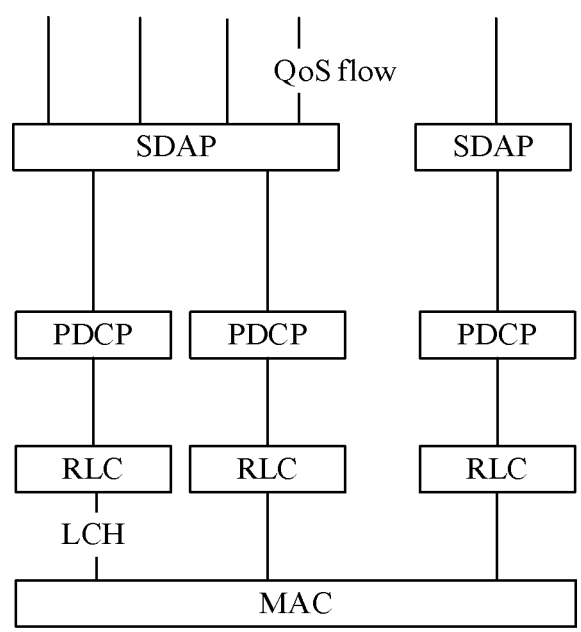
FIG. 2 is a diagram of a protocol stack architecture in a new radio NR system.
Figure 3:
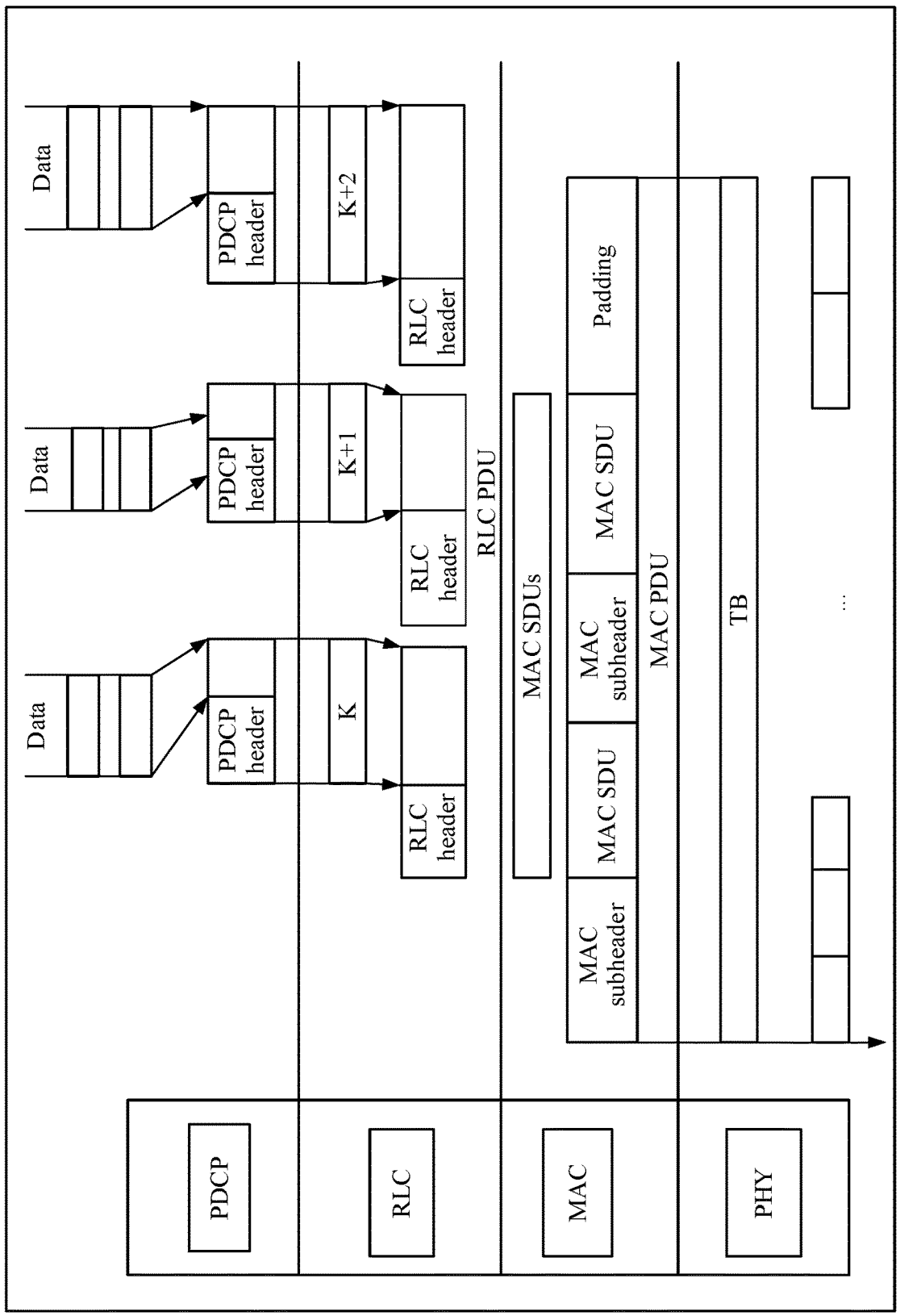
FIG. 3 is a schematic diagram of a data packet processing process in a new radio NR system.

FIG. 2 is a protocol stack architecture in a new radio NR system. FIG. 3 is a schematic diagram of a data packet processing process in a new radio NR system. With reference to FIG. 2 and FIG. 3, the embodiments of this application use this case as an example to describe in detail a series of data packet processing processes performed when a transmit end device sends data to a receive end device.

As shown in FIG. 2, the architecture includes a service data adaptation protocol SDAP (SDAP) layer, a packet data convergence protocol (PDCP) layer, a radio link control (RLC) layer, and a media access control (MAC) layer. For a control plane, there is also a radio resource control (RRC) layer. An upper layer of the PDCP layer on the control plane is the RRC layer, and an upper layer of the PDCP layer on a user plane is a network layer, for example, an internet protocol (IP) layer. A lower layer of the PDCP layer is the RLC layer. The PDCP layer may process an RRC message on the control plane and a data packet such as an IP packet on the user plane. As shown in FIG. 3, a data packet from an application layer is sequentially processed at the SDAP layer, the PDCP layer, the RLC layer, the MAC layer, and a physical layer (Phy), and is sent to a corresponding layer of the receive end device over an air interface.

A service data adaptation protocol SDAP entity receives data packets from the application layer. The data packets may be data packets from one service. On a wireless network side, a service is represented in different forms, such as a form of a flow (Quality of Service flow, QoS flow), a form in which the service is mapped to a bearer formed by a PDCP entity, and a form of a logical channel. FIG. 2 shows different service representation forms. A right part of FIG. 2 shows a case in which one service corresponds to one logical channel, and different services may correspond to different logical channels. A left part shows a case in which a service is represented as a QoS flow, and a plurality of QoS flows are mapped to different PDCP entities at the SDAP layer.

The SDAP entity encapsulates the data packet, adds an SDAP header to the data packet, and maps the data packet to a packet data convergence protocol PDCP entity. As shown in FIG. 3, the PDCP entity receives the data packet encapsulated by the SDAP entity, and performs header compression and decompression, encryption and decryption, data integrity protection, integrity check, lower-layer service data unit SDU (SDU) duplication detection, and the like on the data, to further transmit the data to a radio link control RLC entity. A main function of the PDCP layer includes a security processing function. The security processing function may include data encryption/decryption, integrity protection/check, and the like. Encryption and integrity protection correspond to a transmit end, and decryption and integrity check correspond to a receive end. Downlink transmission is used as an example. On the user plane, after obtaining an IP data packet from an upper layer, the PDCP layer decrypts the IP data packet, and then delivers the IP data packet to the RLC layer. On the control plane, the PDCP layer provides a signaling transmission service for the upper RRC layer and implements encryption and integrity protection for RRC signaling. Similarly, in uplink transmission, on the user plane, the PDCP layer may encrypt an uplink data packet; and on the control plane, the PDCP layer may implement decryption and integrity check for RRC signaling.

The RLC entity receives the data packet from the PDCP entity, and performs data transmission. The RLC entity may complete segmentation and reassembly of a service data unit RLC SDU, duplication detection and protocol error detection of the RLC SDU, and the like. In addition, it should be noted that a protocol data unit PDU (PDU) is a data unit transmitted between peer layers. For example, an RLC PDU is a data unit exchanged between an RLC layer of a transmit end and an RLC layer of a receive end. An SDU is a service data unit, is also referred to as a service data unit, and is a data set of a user service at a specified layer. When the SDU is transmitted to a same protocol layer of a receiver, data does not change. Then, after the SDU is delivered to a lower layer, the lower layer encapsulates the SDU in a PDU and sends the PDU. The SDU is an information unit transmitted from a higher protocol layer to a lower protocol layer. SDUs at an $N^{th}$ layer one-to-one correspond to PDUs at an upper layer. Usually, a sender adds protocol control information PCI (PCI) to a SDU delivered by a user and encapsulates the SDU into a PDU. A receiver removes the PCI to decapsulate the PDU, restores the SDU, and then sends the SDU to a receiver user. However, if bandwidth of a lower-layer channel cannot satisfy an SDU transmission requirement, one SDU needs to be divided into a plurality of segments, and the segments are separately encapsulated into PDUs for sending. This is SDU segmentation. Then, the receiver decapsulates the PDUs, and reassembles the PDUs into the SDU.

A channel between the RLC layer and the media access control MAC layer is referred to as a logical channel (LCH). A logical channel type set provides different types of data transmission services for a MAC entity, and the logical channel can be identified at the PDCP layer, the RLC layer, and the MAC layer. The MAC entity provides a data transmission service on the logical channel, receives the data packet from the RLC entity, and implements mapping from the logical channel to a transport channel. The MAC entity receives service data units MAC SDUs from a plurality of logical channels, and completes multiplexing and demultiplexing of the MAC SDUs. A protocol data unit MAC PDU of the MAC entity is a data unit transmitted inside the MAC entity. In addition, the MAC entity can further complete management on priorities of different logical channels priority (LCP) of a same receive end device, priority management performed between different receive end devices through dynamic scheduling, an error correction function based on a Hybrid Automatic Repeat reQuest (HARD) mechanism, and the like. The LCP means a process in which the MAC entity allocates resources to different logical channels based on sizes of the transmission resources and priorities of the logical channels. After the LCP process ends, zero or more resources are allocated to each logical channel. In an existing protocol, after a resource is allocated to each logical channel, data packets are placed on the allocated resource in order.

There is a transport channel between the MAC layer and the physical layer, and the physical layer provides a data service for a higher layer in a form of a transport channel. In addition, for data from an upper-layer transport channel and control information at the physical layer, the physical layer performs procedures such as cyclic redundancy check (CRC), code block segmentation, channel coding, rate matching, and code block connection, then performs operations such as scrambling, modulation, layer mapping, and precoding, and finally sends the data and the control information over an air interface.

It should be understood that, in the embodiments of this application, the transmit end device and the receive end device are devices that may be applied to a wireless communications system. Specifically, the transmit end device may be a network device or user equipment, and the receive end device may be a network device or user equipment. Whether the transmit end device or the receive end device is specifically the network device or the user equipment is not limited. In the following embodiments of this application, a requirement on a user equipment UE side is used as an example for detailed description. However, the embodiments of this application are not limited thereto.

During resource allocation, the network device usually allocates a large resource based on a requirement of the user equipment UE, for example, based on an amount that is of to-be-sent data and that is reported by the UE. The UE may place different data packets of a same logical channel together at the MAC layer through concatenation for sending; or sequentially place different data packets of different logical channels onto a same resource through multiplexing for sending.

Both concatenation and multiplexing can improve resource utilization, and can ensure that the UE makes, to the greatest extent, full use of the resource allocated by the network. Otherwise, if only one data packet of each logical channel can be used to form a final transport block (TB) each time, a resource waste is caused. However, a problem brought by the concatenation is that if two consecutive data packets of a same service are placed on one resource, the two consecutive data packets are lost if the resource fails to be sent. To ensure that a probability that two consecutive data packets are lost is less than 10', it needs to be ensured that a failure probability corresponding to each resource is less than 10'. This requirement causes that a transmission reliability requirement and a resource utilization requirement cannot be simultaneously satisfied, and a frequency resource cannot be effectively used. Therefore, a method that can be used to not only ensure transmission reliability but also improve resource utilization is required to implement data packet transmission. No concatenation occurs above the MAC layer. Therefore, one RLC PDU corresponds to one data packet or data packet segment. In other words, one RLC PDU includes and includes only one application-layer data packet or data packet segment. To avoid a continuous packet loss of one service, consecutive RLC PDUs of the service cannot be placed onto one transport block. This means that consecutive application-layer data packets cannot be placed onto one transport block.

In the embodiments of this application, it is expected to implement a requirement of a deterministic service in a manner in which two consecutive data packets of a same service are prevented from being concatenated to a same resource, and reliability of a data packet is improved when it is detected that a previous data packet is lost.

Therefore, for different representation forms in which data packets are from one service in FIG. 2, to avoid placing consecutive data packets of a same service into a same MAC PDU is to avoid placing consecutive data packets of a same logical channel, a same PDCP entity (bearer), or a same QoS flow into a same MAC PDU. When data packets are from one logical channel corresponding to one service, in this case, to avoid a continuous packet loss of the service, a MAC layer needs to place consecutive data packets of a same logical channel onto different resources for transmission, to avoid the continuous packet loss of the same service. When data packets are from a QoS flow, a plurality of QoS flows are mapped to different PDCP entities at an SDAP layer. In this case, a MAC layer needs to place data packets of a same QoS flow that are obtained in consecutive order onto different resources for transmission, to avoid a continuous packet loss of the same QoS flow. Alternatively, when data packets are from bearers of a same PDCP entity, the PDCP entity may send any two data packets with consecutive PDCP sequence numbers to different RLC entities, to avoid placing consecutive data packets of a same service into a same MAC PDU. The following describes the three cases in detail.

FIG. 4 is a schematic flowchart of a communications method 400 according to an embodiment of this application. The method 400 may be applied to the foregoing wireless communications system 100. An example in which a transmit end device sends data to a receive end device is used for detailed description. It should be understood that this embodiment of this application is not limited thereto.

As shown in FIG. 4, the method 400 includes the following content.

S410: A MAC entity obtains M radio link control RLC protocol data units RLC PDUs, where M is an integer greater than or equal to 2.

A data packet from a deterministic service is processed at an SDAP layer, a PDCP layer, and an RLC layer. One data packet corresponds to one RLC PDU. In one embodiment, one RLC PDU includes and includes only one application-layer data packet or data packet segment. For example, a special deterministic service 1 includes M data packets, which correspond to M RLC PDUs at the RLC layer. An RLC entity sequentially adds an RLC sequence number to a packet header of each RLC PDU. In this case, each of the M RLC PDUs has a different RLC sequence number. The deterministic service 1 corresponds to a logical channel 1, the M RLC PDUs with consecutive RLC sequence numbers are mapped to the logical channel 1, and the M RLC PDUs include at least two RLC PDUs corresponding to the logical channel 1 and having consecutive RLC sequence numbers. It should be understood that, "consecutive" in this embodiment of this application means that sequence numbers of data units are consecutive in different entities.

S420: The MAC entity generates N media access control MAC protocol data units MAC PDUs based on a logical channel corresponding to each of the M RLC PDUs, where any two RLC PDUs corresponding to a same logical channel and having consecutive RLC sequence numbers are carried in different MAC PDUs, and N is an integer greater than or equal to 2.

The MAC entity provides a data transmission service on the logical channel, obtains the M RLC PDUs with consecutive RLC sequence numbers from the RLC entity, and implements mapping from the logical channel to a transport channel. It should be understood that the logical channel corresponding to each RLC PDU herein may be understood as that each RLC PDU belongs to the logical channel and is transmitted to the MAC entity through the logical channel.

The MAC entity obtains, through the logical channel 1, the M RLC PDUs that are transmitted by the RLC entity and that have the consecutive RLC sequence numbers, and generates MAC PDUs. The MAC entity can identify the logical channel, namely, the logical channel 1. In a process of generating the MAC PDUs, the MAC entity allocates a MAC PDU resource to each logical channel based on a logical channel priority LCP, and sequentially places RLC PDUs of each logical channel onto the MAC PDU resource allocated to the logical channel, until the entire resource is used. To avoid a case in which two consecutive data packets of a same service are concatenated to a same resource, and consequently, the two consecutive data packets of the same service are lost if a transport block fails to be transmitted in a data packet transmission process, this embodiment of this application provides the following three cases.

Case 1:

The following limitation is imposed: only one RLC PDU of a same logical channel is placed into one MAC PDU. For example, for the logical channel 1, the following limitation is imposed: only RLC PDUs with nonconsecutive RLC sequence numbers can be placed into a resource allocated to the logical channel 1 in one MAC PDU. Subsequently, one MAC PDU corresponds to one transport block (TB), and one MAC PDU is placed onto one TB. In this way, data transmission between a MAC layer and a physical layer is implemented.

According to the method in the foregoing case 1, in a process of generating a MAC PDU based on an RLC PDU, the following limitation is imposed: one MAC PDU includes only one RLC PDU of a same logical channel, to avoid concatenating two consecutive data packets of a same logical channel to a same resource. In this case, in a data packet transmission process, if one transport block fails to be transmitted, for the logical channel 1, this means that one data packet fails to be transmitted. Therefore, impact of a TB transmission failure on a service is reduced, so that a data packet transmission failure probability can be reduced, and a requirement of a deterministic service can be implemented.

It should be understood that, preferably, a MAC PDU resource is divided based on a quantity of bits occupied by an RLC PDU. To be specific, a size of a resource that is allocated to the logical channel 1 and that is in a payload part in a MAC PDU is equal to a quantity of bits occupied by a current to-be-placed RLC PDU. In this case, the RLC PDU may be directly placed into the current MAC PDU, and this does not cause a problem of low resource utilization.

However, a resource allocated to the logical channel 1 in a MAC PDU may alternatively be unequal to, for example, greater than or less than, a quantity of bits occupied by an RLC PDU that is currently to be placed onto the logical channel.

Case 2:

When a quantity of bits that can be carried by a resource that is allocated to the logical channel 1 and that is in a payload part in a MAC PDU is less than a quantity of bits occupied by a current to-be-placed RLC PDU, after the RLC PDU reaches a MAC layer, the RLC PDU is a service data unit MAC SDU of the MAC layer. When a quantity of bits occupied by one MAC SDU is greater than a size of the resource that is allocated to the logical channel and that is in the payload part in the MAC PDU, the MAC SDU (RLC PDU) may be segmented and placed into different MAC PDUs, and one MAC PDU is placed onto one TB. In this way, consecutive data packets of the logical channel are not placed onto one resource. It should be understood that, for an RLC PDU, segments obtained after the RLC PDU is segmented have a same RLC sequence number. For example, if the RLC PDU is segmented into two segments, the two segments have a same RLC sequence number that is an RLC sequence number of the original RLC PDU.

In an implementation, RLC PDUs (or RLC PDU segments) with consecutive RLC sequence numbers may be placed into different MAC PDUs at intervals. For example, two RLC PDUs (or RLC PDU segments) with consecutive RLC sequence numbers are respectively placed into a first MAC PDU and a second MAC PDU, and an interval between sequence numbers SNs of the first MAC PDU and the second MAC PDU is k, where k is a positive integer greater than or equal to 2.

It should be understood that the interval described in this embodiment of this application may be specifically explained as follows: There is an interval of zero RLC PDUs between an RLC PDU 1 and an RLC PDU 2, and a sequence number interval is 1. There is an interval of one RLC PDU between the RLC PDU 1 and an RLC PDU 3, and a sequence number interval is 2. Likewise, that the interval between the sequence numbers SNs of the first MAC PDU and the second MAC PDU is k may mean that there are k−1 MAC PDUs between the first MAC PDU and the second MAC PDU. For example, an interval between MAC sequence numbers of a MAC PDU 1 and a MAC PDU 2 is 1. There is an interval of one MAC PDU between the MAC PDU 1 and a MAC PDU 3, and a sequence number interval is 2. Two PDUs with an interval of zero PDUs are consecutive PDUs described in this application.

It should be understood that, currently, one transport block TB includes only one MAC PDU, but a case in which one TB includes a plurality of MAC PDUs is not excluded. Therefore, an interval k may be set between two MAC PDUs into which two consecutive RLC PDUs are placed. For example, when one TB includes two MAC PDUs, the RLC PDU 1 is correspondingly placed into the MAC PDU 1, and the RLC PDU 2 is correspondingly placed into the MAC PDU 3. Therefore, the MAC PDU 3 and the MAC PDU 1 are not placed onto one TB, to further ensure that two RLC PDUs with consecutive sequence numbers SNs are not on one transmission resource, so as to improve transmission reliability. A specific interval may be configured by a network, and for example, may be a value configured by using higher layer signaling or RRC signaling; or may be autonomously selected by UE. If the UE autonomously selects the interval, a different interval may be selected each time, but the interval is at least one MAC PDU.

Case 3:

When a quantity of bits that can be carried by a resource allocated to the logical channel 1 in a MAC PDU is greater than a quantity of bits occupied by a current to-be-placed RLC PDU, if only one RLC PDU of the current logical channel 1 is placed into one MAC PDU, a resource waste is caused. Therefore, to improve resource utilization, another implementation is introduced.

After receiving a transport block TB obtained after assembly performed at a MAC layer, a physical layer splits the transport block TB into different code blocks (CB). As described above, the physical layer performs a series of processing such as scrambling, modulation, layer mapping, and precoding on data packets in data from an upper-layer transport channel and control information at the physical layer. In a data transmission process, factors such as coding efficiency, a coder limitation, and a processing latency are considered, and it is determined that a maximum coding length that can be processed during channel coding is 6144 bits. Therefore, if a sequence of a transport block obtained after CRC bit-level check is greater than 6144 bits, the transport block needs to be segmented to satisfy a channel coding requirement.

Therefore, in this embodiment of this application, the MAC layer needs to learn of a code block segmentation rule of the physical layer. In a process of placing an RLC PDU into a MAC PDU, RLC PDUs with consecutive RLC sequence numbers on the logical channel 1 are placed onto different code blocks according to the segmentation rule, and only one RLC PDU is placed onto one code block. In addition, each code block includes a MAC subheader. After such a code block is received by a physical layer of a receive end, the code block can be independently decoded. If one code block is successfully decoded, the code block can be delivered to a MAC layer without waiting for successful receiving of all code blocks of one TB. In this way, a quick transmission response can be implemented, and transmission efficiency can be improved. In addition, if one TB fails to be transmitted, a code block in the TB may fail to be transmitted, and decoding of another code block is not affected, so that transmission reliability is improved.

In the foregoing three cases, in a process of placing an RLC PDU into a MAC PDU, in another example instead of a limitation, an interval between sequence numbers SNs of a first MAC PDU and a second MAC PDU in the N MAC PDUs is greater than or equal to k, where k is an integer greater than or equal to 2. In one embodiment, k may be a specified threshold. The first MAC PDU carries a first RLC PDU corresponding to a first logical channel, the second MAC PDU carries a second RLC PDU corresponding to the first logical channel, and RLC sequence numbers of the first RLC PDU and the second RLC PDU are consecutive. The logical channel 1 is used as an example. A first RLC PDU and a second RLC PDU with consecutive RLC sequence numbers on the logical channel 1 are correspondingly placed into a first MAC PDU and a second MAC PDU. The first MAC PDU and the second MAC PDU are nonconsecutive, and an interval between RLC sequence numbers of the first MAC PDU and the second MAC PDU is greater than or equal to k, where k is an integer greater than or equal to 2. A specific interval may be configured by a network, and for example, may be a value configured by using higher layer signaling or RRC signaling; or may be autonomously selected by UE. If the UE autonomously selects the interval, a different interval may be selected each time, but the interval is at least one MAC PDU.

Case 4:

In addition to the foregoing three cases, to ensure resource utilization and reduce impact caused by a loss of two consecutive data packets of a same service, in another example instead of a limitation, a third MAC PDU in the N MAC PDUs carries T RLC PDUs corresponding to a same logical channel, where T is an integer greater than or equal to 2. An interval between RLC sequence numbers of any two of the T RLC PDUs is greater than or equal to t, where t is an integer greater than or equal to 2. A specific interval may be configured by a network, and for example, may be a value configured by using higher layer signaling or RRC signaling; or may be autonomously selected by UE. If the UE autonomously selects the interval, a different interval may be selected each time, but the interval is at least one RLC PDU.

The logical channel 1 is used as an example. A first RLC PDU and a second RLC PDU with consecutive RLC sequence numbers exist on the logical channel 1. In a process of placing an RLC PDU into a MAC PDU, the MAC PDU is referred to as a third MAC PDU for distinguishing from that in the foregoing several cases. A plurality of RLC PDUs, for example, a first RLC PDU and a second RLC PDU, are placed onto a resource allocated to the logical channel 1 in the third MAC PDU, and it is ensured that the first RLC PDU and the second RLC PDU are RLC PDUs with nonconsecutive RLC sequence numbers. An interval between the RLC sequence numbers of the first RLC PDU and the second RLC PDU is greater than or equal to t, where t is an integer greater than or equal to 2. A specific interval may be configured by a network, and for example, may be a value configured by using higher layer signaling or RRC signaling; or may be autonomously selected by UE. If the UE autonomously selects the interval, a different interval may be selected each time, but the interval is at least one MAC PDU. For example, an RLC PDU 1 and an RLC PDU 3 are placed into one MAC PDU, 1 and 3 are RLC sequence numbers of the RLC PDUs, and an interval between the RLC SNs of the RLC PDUs is 2.

It should be understood that the first RLC PDU and the second RLC PDU herein are merely an example instead of a limitation, and refer to at least two RLC PDUs placed into one MAC PDU that are of a same logical channel and that have nonconsecutive RLC sequence numbers. A quantity of RLC PDUs is not limited. For example, there are T RLC PDUs, where every two of the T RLC PDUs have nonconsecutive RLC sequence numbers. An optimal situation is that a MAC PDU resource is fully used.

In one embodiment, in a process in which a plurality of RLC PDUs with nonconsecutive RLC sequence numbers on a same logical channel are placed into one MAC PDU, the plurality of RLC PDUs with the nonconsecutive RLC sequence numbers on the same logical channel may be placed onto one code block according to the method described in the case 3.

After such a code block is received by a physical layer of a receive end, the code block can be independently decoded. If one code block is successfully decoded, the code block can be delivered to a MAC layer without waiting for successful receiving of all code blocks of one TB. In this way, a quick transmission response can be implemented, and transmission efficiency can be improved. In addition, if one TB fails to be transmitted, a code block in the TB may fail to be transmitted, and decoding of another code block is not affected, so that transmission reliability is improved.

According to the methods in the foregoing embodiment, two consecutive data packets of a same service can be prevented from being concatenated to a same resource, to ensure that in a data packet transmission process, impact caused by a transmission failure of one TB on a service is reduced. In this way, a data packet transmission failure probability can be reduced, and a requirement of a deterministic service can be implemented.

In actual application, instead of being from one logical channel such as the foregoing logical channel 1, data packets may alternatively be from a QoS flow. Different services belong to different QoS flows. A QoS flow is a set of services that have a same quality of service requirement and a same rate requirement. In this case, consecutive data packets of a same QoS flow cannot be placed into a same resource. Currently, the QoS flow is visible at only an SDAP layer and a PDCP layer. A plurality of QoS flows may be mapped to different logical channels or a same logical channel at the SDAP layer, but QoS flows from two SDAP layers cannot be mapped to a same PDCP layer.

FIG. 5 is a schematic flowchart of a communications method 500 according to an embodiment of this application. The method 500 may be applied to the foregoing wireless communications system 100. An example in which a transmit end device sends data to a receive end device is used for detailed description. It should be understood that this embodiment of this application is not limited thereto.

As shown in FIG. 5, the method 500 includes the following content.

S510: A media access control MAC entity obtains M radio link control RLC protocol data units RLC PDUs, where M is an integer greater than or equal to 2.

With reference to a data packet processing process shown in FIG. 3, a data packet from a flow is processed at an SDAP layer, a PDCP layer, and an RLC layer. One data packet corresponds to one RLC PDU. In one embodiment, one RLC PDU includes and includes only one application-layer data packet or data packet segment. For example, M data packets of a flow correspond to M RLC PDUs at the RLC layer. An RLC entity sequentially adds an RLC sequence number to a packet header of each RLC PDU. In this case, each of the M RLC PDUs has a different RLC sequence number. A plurality of flows may be aggregated at the SDAP layer or PDCP layer and then mapped to different logical channels or a same logical channel. A plurality of data packets of the plurality of flows correspond to a plurality of RLC PDUs at the RLC layer. To avoid a continuous packet loss of a same flow, at a MAC layer, RLC PDUs of the same flow that are obtained in consecutive order are placed on different resources for transmission.

In one embodiment, for example, it is assumed that RLC PDUs corresponding to a first flow in the plurality of flows include an RLC PDU 1, an RLC PDU 2, an RLC PDU 3, and an RLC PDU 4, and RLC PDUs corresponding to a second flow include an RLC PDU a, an RLC PDU b, an RLC PDU c, and an RLC PDU d. Data packets of the first flow and the second flow are aggregated at the SDAP layer or the PDCP layer and mapped to a plurality of RLC PDUs at the RLC layer. For example, an order may be as follows: RLC PDU 1→RLC PDU 2→RLC PDU a→RLC PDU 3→RLC PDU b→RLC PDU c→RLC PDU 4→RLC PDU d. The RLC PDUs are mapped to a same logical channel in such order. In this case, RLC PDUs that belong to a same flow and that are obtained in consecutive order include, for example, the RLC PDU 1 and the RLC PDU 2, or the RLC PDU b and the RLC PDU c. According to the method provided in this embodiment of this application, the RLC PDU 1 and the RLC PDU 2 need to be placed on different resources, and the RLC PDU b and the RLC PDU c need to be placed on different resources for transmission.

To achieve the foregoing objective, before generating N MAC PDUs, the MAC layer needs to identify M RLC PDUs that belong to a same flow and that have consecutive RLC sequence numbers in a plurality of RLC PDUs. Because the MAC layer cannot directly identify a flow, another layer needs to be used to determine a flow corresponding to the plurality of RLC PDUs.

In one embodiment, the MAC layer determines, based on an SDAP header encapsulated when an SDAP PDU is generated at the SDAP layer by using a data packet, a flow identifier (QoS flow Identifier, QFI) carried in an RLC PDU corresponding to each SDAP PDU, to determine a flow corresponding to the M RLC PDUs. The SDAP layer first adds an SDAP header to a data packet, so that an RLC PDU at the RLC layer carries the SDAP header. In addition, the MAC layer needs to read the SDAP header to identify a flow ID, and then identify the flow corresponding to the M RLC PDUs.

It should be understood that "determining a flow corresponding to the plurality of RLC PDUs" herein may be understood as determining a specific flow to which data packets included in the plurality of RLC PDUs belong, in other words, determining a specific flow to which a data packet that is not processed, such as encapsulated, at the SDAP layer or the PDCP layer belongs before the data packet reaches the SDAP layer. In this way, consecutive data packets of a same flow are determined.

In another implementation, in a process in which a PDCP header is added to a data packet at the PDCP layer, an indicator field is added to the data packet to indicate a QFI. In this implementation, an SDAP header does not need to be read, but the MAC layer still needs to read the PDCP header to determine the QFI indicated by the indicator field, so as to identify the flow corresponding to the M RLC PDUs. With reference to the data packet processing process in FIG. 3, it can be learned that a payload part other than an RLC header in an RLC PDU carries an upper-layer header such as an SDAP header or a PDCP header. Therefore, the QFI may be identified by using the foregoing method, so as to identify the flow corresponding to the M RLC PDUs.

S520: The MAC entity generates N MAC PDUs based on a QoS flow corresponding to each of the M RLC PDUs, so that any two RLC PDUs corresponding to a same flow that are obtained in consecutive order are carried in different MAC PDUs, where N is an integer greater than or equal to 2.

After the MAC layer identifies the QoS flow, subsequent behavior is consistent with behavior of processing a data packet of the logical channel 1 by the MAC layer in the embodiments. To be specific, the method described in the method 400 is performed to place data packets of a same QoS flow that are obtained in consecutive order into different MAC PDUs or code blocks.

The foregoing special processing on the data packet of the logical channel or the QoS flow during concatenation may be configured by using higher layer signaling. For example, a network may configure the MAC layer to apply the foregoing rule to some logical channels or some QoS flows, but another logical channel is still processed by using the prior art. It should be understood that this embodiment of this application is not limited thereto.

It should be understood that a transport block TB herein is a physical layer concept, and corresponds to a MAC PDU at the MAC layer. In the prior art, only one MAC PDU can be placed onto one transport block. Certainly, a subsequent case in which there are two MAC PDUs on one transport block TB is not excluded. Therefore, to ensure comprehensive solution protection herein, when one transport block TB may include two or more MAC PDUs subsequently, by analogy with the foregoing solution, the solution may be extended as follows: The following limitation is imposed: one RLC PDU is placed into one MAC PDU, and the following limitation is imposed: one transport block TB includes only one RLC PDU corresponding to a service 1, or includes a plurality of RLC PDUs that is of a service 1 and that have nonconsecutive sequence numbers SNs. The RLC PDU may be an RLC PDU generated from an RLC SDU that is not segmented, or may be an RLC PDU generated from an RLC SDU that is segmented.

In another implementation, the media access control MAC entity obtains the M RLC PDUs, where M is an integer greater than or equal to 2. The MAC entity generates the N media access control MAC protocol data units MAC PDUs based on a bearer corresponding to each of the M RLC PDUs, where any two RLC PDUs corresponding to a same bearer and having consecutive PDCP sequence numbers are carried in different MAC PDUs, and N is an integer greater than or equal to 2.

With reference to the data packet processing process shown in FIG. 3, for example, one bearer may include M data packets, which correspond to M PDCP PDUs at the PDCP layer. A PDCP entity adds a PDCP sequence number to a header of each PDCP PDU in order. In this case, each of the M PDCP PDUs has a different PDCP sequence number. Then, the PDCP PDUs correspond to the M RLC PDUs formed at the RLC layer, and a payload of each RLC PDU includes a unique PDCP sequence number.

To avoid a continuous packet loss of a same bearer, at the MAC layer, RLC PDUs of a same bearer that have consecutive PDCP sequence numbers are placed on different resources for transmission. To achieve the foregoing objective, before generating the N MAC PDUs, the MAC layer needs to identify M PDCP PDUs that belong to a same bearer and that have consecutive PDCP sequence numbers in a plurality of RLC PDUs.

In one embodiment, the MAC layer reads a PDCP header encapsulated in a payload part of the RLC PDU, to determine a PDCP sequence number in each RLC PDU.

In one embodiment, when a quantity of bits occupied by the RLC PDU is greater than a quantity of bits occupied by a payload part of a MAC PDU into which the RLC PDU is to be placed, a segment of the RLC PDU may be placed based on the quantity of bits occupied by the payload part of the MAC PDU. An RLC sequence number of an RLC PDU obtained after segmentation remains unchanged, to ensure that the RLC PDU and a next RLC PDU that have consecutive RLC sequence numbers are carried in different MAC PDUs.

According to the communications method provided in this embodiment of this application, for example, the transmit end device sends data to the receive end device, and the MAC layer reads a PDCP sequence number of a data packet at the PDCP layer in a cross-layer manner. In a process in which the MAC entity obtains M RLC PDUs with consecutive PDCP sequence numbers from a same bearer, and generates MAC PDUs, the MAC entity places RLC PDUs of each bearer that have consecutive PDCP sequence numbers into different MAC PDUs, to avoid a case in which two consecutive data packets of a same service are concatenated to a same resource, and consequently, the two consecutive data packets of the same service are lost if a transport block fails to be transmitted in a data packet transmission process. This improves transmission reliability and user experience.

In one embodiment, an interval between MAC sequence numbers of a first MAC PDU and a second MAC PDU in the N MAC PDUs is greater than or equal to k, k is an integer greater than or equal to 2, the first MAC PDU carries a first RLC PDU of a first bearer, the second MAC PDU carries a second RLC PDU of the first bearer, and the first RLC PDU and the second RLC PDU have consecutive PDCP sequence numbers.

In an optional implementation, RLC PDUs of a same bearer that have consecutive PDCP sequence numbers are placed into different MAC PDUs, and there is a specific interval between the MAC PDUs for placement. This further reduces a possibility that two consecutive data packets of a same service are concatenated to a same resource, and improves transmission reliability.

In one embodiment, a third MAC PDU in the N MAC PDUs carries T RLC PDUs corresponding to a same bearer, T is an integer greater than or equal to 2, T is less than M, an interval between PDCP sequence numbers of any two of the T RLC PDUs is greater than or equal to t, and t is an integer greater than or equal to 2.

In the foregoing technical solution, a plurality of RLC PDUs with nonconsecutive PDCP sequence numbers are placed into one MAC PDU, to improve resource utilization and improve transmission reliability.

Figure 6:
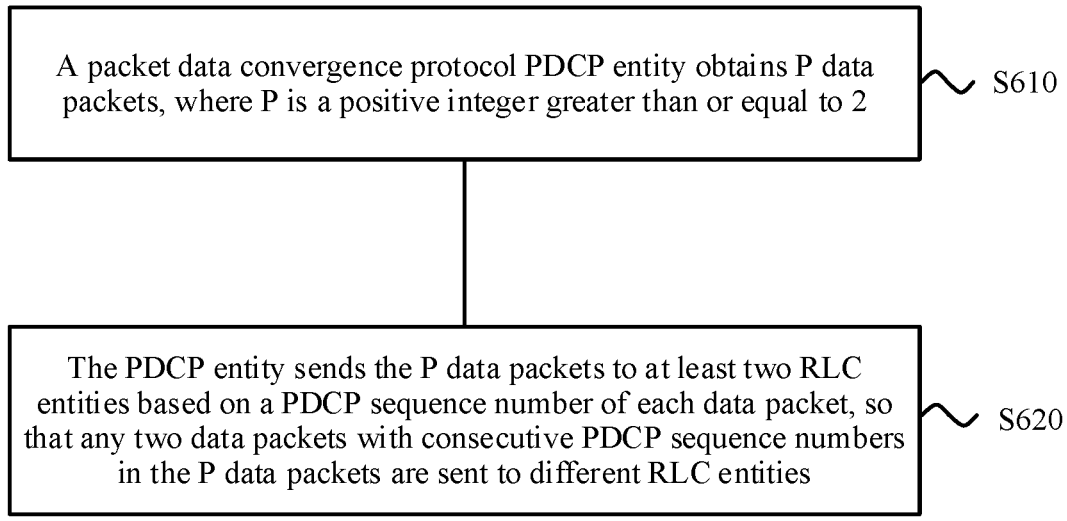
FIG. 6 is a schematic flowchart of another example of a communications method according to an embodiment of this application.

FIG. 6 is a schematic flowchart of a communications method 600 according to an embodiment of this application. The method 600 may be applied to the foregoing wireless communications system 100. An example in which a transmit end device sends data to a receive end device is used for detailed description. It should be understood that this embodiment of this application is not limited thereto.

Figure 7:
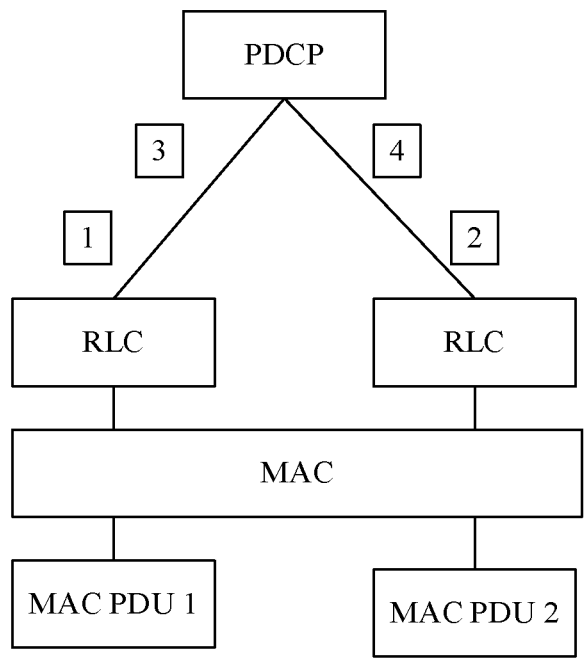
FIG. 7 is a schematic diagram of another example of a communications method according to an embodiment of this application.

FIG. 7 is a schematic diagram of a communications method according to an embodiment of this application. The following provides detailed descriptions with reference to FIG. 6 and FIG. 7.

As shown in FIG. 6, the method 600 includes the following content.

S610: A packet data convergence protocol PDCP entity obtains P data packets, where P is a positive integer greater than or equal to 2.

In the prior art, flow splitting exists. For example, an SDAP layer aggregates data packets of services with a same rate requirement and a same quality requirement, and transmits the data packets to a PDCP layer. In this case, load of the PDCP layer is very high, and resources are insufficient or not enough in a subsequent resource allocation process. Therefore, to share the load, flow splitting occurs. For a same bearer formed from a same service, the PDCP entity is responsible for splitting P data packets onto different logical channels. As shown in FIG. 7, an example in which the PDCP entity splits the data packets onto two logical channels is used for detailed description. The PDCP entity splits the data packets and transmits the data packets to two different RLC entities corresponding to an RLC layer. Then, the two different RLC entities map the data packets to two different logical channels, to transmit the data packets to a MAC layer. It should be understood that, that the PDCP entity sends the data packets to at least two RLC entities herein is equivalent to that the PDCP entity maps the data packets to at least two logical channels.

For such a special service, a network may configure, by configuring higher layer signaling, for example, RRC (RRC) signaling, the PDCP entity to split data packets of the service that have consecutive sequence numbers SNs to different RLC entities during flow splitting, that is, map the data packets to different logical channels. With reference to the schematic diagram FIG. 3, the PDCP layer obtains the P data packets, and in a process in which the PDCP layer generates P corresponding PDCP PDUs by adding PDCP headers or the like, the PDCP layer sequentially adds PDCP sequence numbers to the headers of all the PDCP PDUs. In this case, each of the P PDCP PDUs has a different PDCP sequence number.

S620: The PDCP entity sends the P data packets to at least two RLC entities based on a PDCP sequence number of each data packet, so that any two data packets with consecutive PDCP sequence numbers in the P data packets are sent to different RLC entities.

Specifically, for example, as shown in FIG. 7, in a flow splitting process, the PDCP entity sends two data packets of a same service that have consecutive PDCP SNs to different RLC entities, to form one bearer. For example, data packets 1, 2, 3, and 4 are consecutive. Then, the data packets are mapped to different logical channels. To be specific, the data packets 1 and 2 are mapped to different logical channels, the data packets 2 and 3 are mapped to different logical channels, and the data packets 3 and 4 are mapped to different logical channels. It should be understood that the figure shows only a case in which the data packets are split to two RLC entities and two logical channels. However, a case in which the data packets are split to more than two logical channels is not excluded in this embodiment of this application.

In one embodiment, H data packets in the P data packets are sent to a first RLC entity in the at least two RLC entities, H is an integer greater than or equal to 2, an interval between sequence numbers SNs of any two of the H data packets is greater than or equal to h, and h is an integer greater than or equal to 2.

Specifically, for example, as shown in FIG. 7, in a process in which the PDCP entity sends data packets to different RLC entities, H data packets may be extracted at intervals from P data packets of a same service, where PDCP sequence numbers of every two of the H data packets are nonconsecutive. The H data packets are sent to one RLC entity, and are mapped to one logical channel. A specific interval may be configured by a network. It should be understood that this embodiment of this application is not limited thereto.

After the PDCP layer completes flow splitting, the MAC layer obtains RLC PDUs through different logical channels, and generates MAC PDUs. To prevent two consecutive data packets of a same service from being placed on a same resource for transmission, in this embodiment of this application, during multiplexing at the MAC layer, the following limitation may be imposed: in a process of generating a MAC PDU, the MAC layer cannot place data of at least two logical channels into the MAC PDU. In other words, an RLC PDU on only one logical channel can be placed into one MAC PDU. It should be understood that the limited logical channel herein is any one of at least two logical channels to which the service is split. For a logical channel corresponding to another service, multiplexing or the like may be performed to ensure resource utilization. This is not limited in this application. It should be further understood that, in this case, for the MAC PDU generated based on a size of a resource and a size of the RLC PDU on the logical channel, a quantity of RLC PDUs placed into the MAC PDU is not limited, and a case in which consecutive RLC PDUs of a same service are placed on a same resource does not occur.

In one embodiment, in the communications system shown in FIG. 1, when the receive end device is located within coverage of one or more cells (cell groups) and/or carriers (carrier groups) provided by a macro base station or a small cell, and there are one or more cells that serve the receive end device (for example, UE), at least two logical channels to which data packets of a same service are mapped after the service is split may be mapped to different cells or carriers, and a data packet can be transmitted by using a resource of only a corresponding cell (cell group) or carrier (carrier group).

In one embodiment, the network may further configure the MAC layer to preferentially place, in a process in which the MAC layer places an RLC PDU into a MAC PDU, another logical channel that is of a same service and that is not placed into the MAC PDU last time, to avoid a case in which the MAC layer always places data of one of the logical channels, and consequently, the another logical channel cannot be transmitted at all due to the limitation.

The foregoing describes flow splitting performed by the PDCP layer for one bearer formed from a same service. The PDCP layer may alternatively split data packets of a same flow that are obtained in consecutive order onto different logical channels. Processing performed by the MAC layer on the data packets on the logical channels is the same as that described above, and details are not described herein again.

Similarly, the method 600 performed by the PDCP layer may alternatively be completed by an SDAP layer. Specifically, when mapping a service to the PDCP layer, the SDAP layer may split consecutive data packets of a same service to different PDCP entities, and then the consecutive data packets are mapped to different logical channels corresponding to different RLC entities. Processing performed by the MAC layer on RLC PDUs of the different logical channels is the same as that described above, and details are not described herein again.

In an uplink data transmission process, the receive end device needs to allocate a specific resource to transmit data to be sent by the transmit end device. In this case, the receive end device needs to learn of a data amount to allocate the resource. Specifically, for example, in a process in which user equipment UE sends data to an evolved NodeB eNB, a resource required for uplink data transmission is obtained by reporting a buffer status report (BSR). A BSR reporting process is used to notify the eNB of a total amount of data that needs to be sent in an uplink buffer of the UE, and a resource required for sending the data. In a resource allocation process, the resource is allocated by calculating a data amount of each logical channel. An amount of data that is still at the PDCP layer may be divided by 2. For example, in FIG. 7, one bearer is mapped to two logical channels. If there is 100-byte data at the PDCP layer, and the RLC entities respectively have 50-byte data and 60-byte data, the two logical channels respectively have 100-byte data and 110-byte data. In the manner in which the SDAP layer performs flow splitting, because data at the SDAP layer is currently not included in content reported in the BSR, the BSR does not need to be enhanced.

In the foregoing technical solution, through flow splitting at the PDCP layer or the SDAP layer, two data packets of a same service that have consecutive sequence numbers SNs are placed on different resources. The resources herein may be different code blocks, different MAC PDUs, or different transport blocks. Specifically, corresponding limitations may be imposed according to different embodiments. This avoids impact caused by a loss of consecutive data packets of a same service, so that transmission reliability can be improved while ensuring resource utilization, and user experience can be improved.

After receiving an RLC SDU from the PDCP layer, the RLC entity stores the RLC SDU in a sending buffer. After receiving a sending occasion (such as a UL grant) from the MAC layer, the RLC entity segments the RLC SDU based on a size provided by using the sending occasion, and then adds an RLC header to form an RLC PDU. All RLC PDUs need to be stored in a retransmission buffer before being sent. The PDU in the retransmission buffer is retransmitted or removed after a STATUS PDU is received. After receiving a PDU from a peer end, a receive end first determines whether the PDU is a control PDU or a data PDU. If the PDU is a control PDU, the receive end sends the PDU to an RLC control module to determine which PDUs at a transmit end need to be retransmitted. If the PDU is a data PDU, the receive end sends the PDU to a receiving buffer. An RLC header is removed after resorting, and then an RLC SDU is reassembled.

When the UE finds that a data packet of a same logical channel or flow is not successfully transmitted for a long time or fails to be transmitted, that is, transmission of the data packet fails or a transmission time of the data packet exceeds a specified threshold, reliability of the first packet and/or the second packet are/is improved. In this embodiment of this application, the UE is autonomous, and may set a plurality of retransmission manners, for example, a first retransmission manner and a second retransmission manner. The first retransmission manner is used when the first data packet fails to be transmitted or a transmission time exceeds a specified first threshold. After retransmission is performed in the first retransmission manner, if a quantity of retransmission times or a retransmission time exceeds a second threshold, retransmission is initiated in the second retransmission manner. The following several different cases of the second retransmission manner are mainly listed.

Case 1:
The UE actively initiates automatic repeat requets (ARQ) retransmission for the first data packet. In one embodiment, in the communications system shown in FIG. 1, when the receive end device is located within coverage of one or more cells (carriers) provided by a macro base station or a small cell, and there are one or more cells that serve the receive end device (for example, the UE), in an ARQ process for the first data packet, resources of different cells or carriers may be used to perform ARQ retransmission on the data packet.

Case 2:
The UE actively initiates ARQ retransmission for the first data packet, and is not limited to using the first retransmission manner or the second retransmission manner. In addition, reliability of the second data packet is improved. In one embodiment, in the communications system shown in FIG. 1, when the receive end device is located within coverage of one or more cells (carriers) provided by a macro base station or a small cell, and there are one or more cells that serve the receive end device (for example, the UE), the RLC entity may perform ARQ retransmission on the second data through one or more other cells.

In one embodiment, the PDCP entity may be further triggered to perform replication, and replicate the second data packet to different logical channels for sending. This is similar to the flow splitting of the bearer in FIG. 7. The second data packet is transmitted on a plurality of logical channels through replication and flow splitting, to improve transmission reliability of the second data packet. This avoids impact caused by a transmission failure of consecutive data packets.

Case 3:
The UE actively initiates ARQ retransmission for the first data packet, and uses a more reliable HARQ configuration or selects a more reliable semi-persistent scheduling resource or parameter. For example, a base station configures several HARQ configurations or several semi-persistent scheduling resources and parameters for the UE. In one embodiment, the base station may further configure a correspondence between these configurations or resources and quantities of retransmission times. For example, when a quantity of retransmission times does not exceed 3, the UE selects a HARQ configuration 1; when a quantity of retransmission times is greater than 3 and less than or equal to 5, the UE selects a HARQ configuration 2; or when a quantity of retransmission times is greater than 5, the UE selects a HARQ configuration 3.

Case 4:
The foregoing several cases are all implementations used when there is a reliable resource for ARQ retransmission. However, it is very likely that the UE currently has no resource or does not have a more reliable resource for ARQ retransmission. In this case, if data to be retransmitted is relatively urgent currently, a request may be sent to a base station by using a BSR or uplink control information (UCI), to indicate that the UE needs a more reliable resource.

In one embodiment, the UE may directly use indication information or use different time-frequency resources to indicate a reliability level of a required resource to the base station. Alternatively, the base station may configure a correspondence between indication information and a reliability level in advance, and the UE sends a request, where each request corresponds to a resource of a different reliability level. The base station receives the request from the UE, and allocates resources of different reliability levels based on different requests. For example, the UE requests a resource of a common reliability level in a normal case, and when a quantity of retransmission times exceeds a specific value, the UE requests a resource of a special reliability level.

It should be understood that the more reliable resource in this embodiment of this application is a resource having a higher reliability level than a current resource. In addition, an LTE rate is related to a quantity of resources (RBs) and MCS efficiency (which is determined by using signal quality). For example, when both a high-frequency resource and a low-frequency resource exist, the more reliable resource may be the low-frequency resource, or may be a resource with a lower modulation and coding scheme (MCS). This is not limited in this embodiment of this application.

In addition, in LTE, when the UE is incapable of simultaneously sending data on a physical uplink shared channel (PUSCH) and a physical uplink control channel (PUCCH), but the UE needs to simultaneously send uplink data and UCI from a higher layer to the base station within a specific time period, the UE can send the two types of data to the base station on the PUSCH only through puncturing or rate matching. Rate matching means that a bit on a transport channel is retransmitted or punctured to match a bearer capability of a physical channel, so that during channel mapping, a bit rate required by a transmission format is reached. Puncturing in rate matching is to puncture a current bit and move a next bit forwards by 1 bit in order. If a quantity of input bits is less than a quantity of output bits, retransmission is used; or if a quantity of input bits is greater than a quantity of output bits, puncturing is used. In this transmission manner, the uplink data is affected.

In LTE, a service priority is not high. Therefore, the impact does not cause a severe problem. However, in NR, many service types are introduced, and there are various types of services with different priorities. For a service with a high priority, puncturing or rate matching should be avoided as much as possible, to reduce impact on uplink data.

In an NR system, a plurality of air interface formats are introduced for an air interface. The air interface format includes at least one of the following parameters: a subcarrier spacing, a PUSCH transmission time, a cyclic prefix length, and the like. A high-priority service is usually mapped to a high-priority air interface format. Therefore, in this embodiment of this application, the UE determines, based on configuration information of the base station, whether puncturing of rate matching can be performed on each uplink transport block. The following enhancement solutions may be introduced.

Solution 1:

The base station configures at least one air interface format. If the UE sends data on a PUSCH in the air interface format, and also needs to send UCI, the UE discards or postpones sending of the UCI.

Solution 2:

The base station configures at least one logical channel or bearer. If a data packet sent by the UE on a PUSCH includes data of the logical channel or bearer, the UE discards or postpones sending of the UCI.

Solution 3:

When allocating a PUSCH resource to the UE by using DCI, the base station adds indication information to the DCI, and the UE determines, according to the indication information, to discard or postpone sending of the UCI.

The foregoing describes in detail the communications methods in the embodiments of this application with reference to FIG. 3 to FIG. 7. The following describes in detail communications apparatuses in the embodiments of this application with reference to FIG. 8 to FIG. 11.

Figure 8:
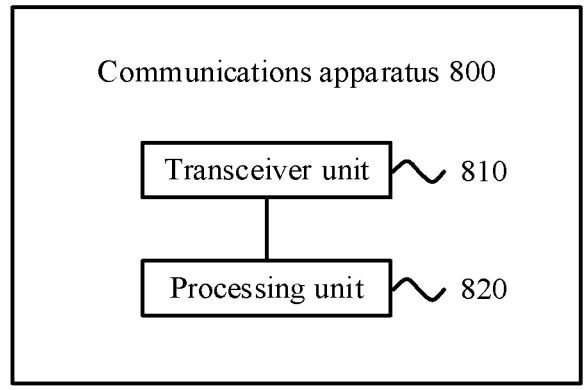
FIG. 8 is a schematic block diagram of an example of a communications apparatus according to an embodiment of this application.

FIG. 8 is a schematic block diagram of a communications apparatus 800 according to an embodiment of this application. As shown in FIG. 8, the communications apparatus 800 includes a transceiver unit 810 and a processing unit 820.

The transceiver unit 810 is configured to obtain M radio link control RLC protocol data units RLC PDUs, where M is an integer greater than or equal to 2.

The processing unit 820 is configured to generate N media access control MAC protocol data units MAC PDUs based on a logical channel corresponding to each of the M RLC PDUs, where any two RLC PDUs corresponding to a same logical channel and having consecutive RLC sequence numbers are carried in different MAC PDUs, and N is an integer greater than or equal to 2.

In one embodiment, the communications apparatus may be a network element; may be a function entity in a network element, for example, an entity such as a MAC entity or a DU and CU entity that can implement a function of a specific layer in a transmit end device or a receive end device; or may be a chip, a chip system including at least one chip, or the like. This is not limited in this embodiment of this application.

In an optional embodiment, the communications apparatus may be an entity corresponding to a MAC layer.

In one embodiment, the transmit end device and the receive end device may be the same or may be different. This is not limited in this embodiment of this application.

In some embodiments, the transmit end device or the receive end device is a network device (for example, a network element). When a CU is separated from a DU, a PDCP entity, an RLC entity, and a MAC entity may be located in different network elements. When a CU and a DU are not separated, a PDCP entity, an RLC entity, and a MAC entity may be located in one network element, and the three entities may use respective processors, which may not be one processor. This is not limited in this embodiment of this application.

In one embodiment, an interval between sequence numbers SNs of a first MAC PDU and a second MAC PDU in the N MAC PDUs generated by the processing unit 820 is greater than or equal to k, k is an integer greater than or equal to 2, the first MAC PDU carries a first RLC PDU on a first logical channel, the second MAC PDU carries a second RLC PDU on the first logical channel, and RLC sequence numbers of the first RLC PDU and the second RLC PDU are consecutive.

In one embodiment, a third MAC PDU in the N MAC PDUs generated by the processing unit carries T RLC PDUs corresponding to a same logical channel, T is an integer greater than or equal to 2, T is less than M, an interval between RLC sequence numbers of any two of the T RLC PDUs is greater than or equal to t, and t is an integer greater than or equal to 2.

It should be understood that the communications apparatus 800 may correspond to (for example, may be configured in or may be) the MAC entity described in the foregoing method 400, and may be configured to perform actions performed by the MAC entity in the method 400 and various processing processes listed above. For brevity, details are not described herein again.

It should be further understood that the data transmission apparatus 800 shown in FIG. 8 is merely an example. The communications apparatus in this embodiment of this application may further include another module or unit, may include modules having functions similar to those of the modules in FIG. 8, or may not necessarily include all the modules in FIG. 8.

Figure 9:
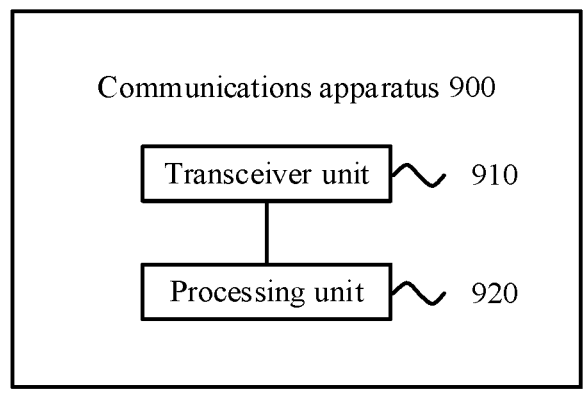
FIG. 9 is a schematic block diagram of another example of a communications apparatus according to an embodiment of this application.

FIG. 9 is a schematic block diagram of a communications apparatus 900 according to an embodiment of this application. As shown in FIG. 9, the communications apparatus 900 includes a transceiver unit 910 and a processing unit 920.

The transceiver unit 910 is configured to obtain M radio link control RLC protocol data units RLC PDUs, where M is an integer greater than or equal to 2.

The processing unit 920 is configured to generate N MAC PDUs based on a flow corresponding to each of the M RLC PDUs, where any two RLC PDUs corresponding to a same flow that are obtained in consecutive order are carried in different MAC PDUs, and N is an integer greater than or equal to 2.

In one embodiment, the communications apparatus may be a network element; may be a function entity in a network element, for example, an entity such as a MAC entity or a DU and CU entity that can implement a function of a specific layer in a transmit end device or a receive end device; or may be a chip, a chip system including at least one chip, or the like. This is not limited in this embodiment of this application.

In an optional embodiment, the communications apparatus may be an entity corresponding to a MAC layer.

In one embodiment, the transmit end device and the receive end device may be the same or may be different. This is not limited in this embodiment of this application.

In one embodiment, an interval between sequence numbers SNs of a first MAC PDU and a second MAC PDU in the N MAC PDUs generated by the processing unit is greater than or equal to k, k is an integer greater than or equal to 2, the first MAC PDU carries a first RLC PDU of a first flow, the second MAC PDU carries a second RLC PDU of the first flow, and RLC sequence numbers of the first RLC PDU and the second RLC PDU are consecutive.

In one embodiment, a third MAC PDU in the N MAC PDUs generated by the processing unit carries T RLC PDUs corresponding to a same flow, T is an integer greater than or equal to 2, an interval between RLC sequence numbers of any two of the T RLC PDUs is greater than or equal to t, and t is an integer greater than or equal to 2.

In one embodiment, the processing unit is further configured to determine, based on a flow identifier carried in each RLC PDU, a flow corresponding to the M RLC PDUs, and the flow identifier is carried in a service data adaptation protocol SDAP header or a packet data convergence protocol PDCP header.

It should be understood that the communications apparatus 900 may correspond to (for example, may be configured in or may be) the MAC entity described in the foregoing method 500, and may be configured to perform actions performed by the MAC entity in the method 1000 and various processing processes listed above. For brevity, details are not described herein again.

It should be further understood that the data transmission apparatus 900 shown in FIG. 9 is merely an example. The communications apparatus in this embodiment of this application may further include another module or unit, may include modules having functions similar to those of the modules in FIG. 9, or may not necessarily include all the modules in FIG. 9.

Figure 10:
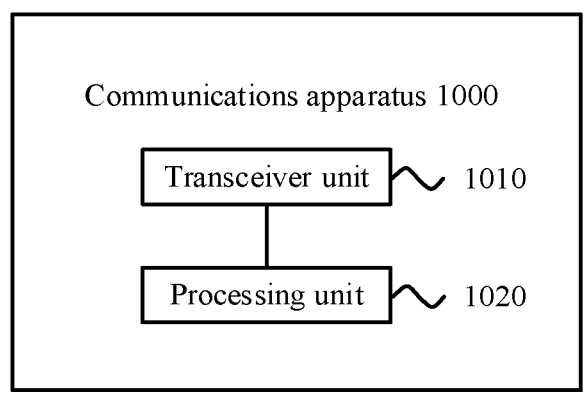
FIG. 10 is a schematic block diagram of another example of a communications apparatus according to an embodiment of this application.

FIG. 10 is a schematic block diagram of a communications apparatus 1000 according to an embodiment of this application. As shown in FIG. 10, the communications apparatus 1000 includes a transceiver unit 1010 and a processing unit 1020.

The transceiver unit 1010 is configured to obtain P data packets, where P is a positive integer greater than or equal to 2.

The processing unit 1020 is configured to send the P data packets to at least two RLC entities based on a PDCP sequence number of each data packet, where any two data packets with consecutive PDCP sequence numbers in the P data packets are sent to different RLC entities.

The processing unit is further configured to send H data packets in the P data packets to a first RLC entity in the at least two RLC entities, H is an integer greater than or equal to 2, an interval between PDCP sequence numbers of any two of the H data packets is greater than or equal to h, and h is an integer greater than or equal to 2.

In one embodiment, the communications apparatus may be a network element; may be a function entity in a network element, for example, an entity such as a PDCP entity or a DU and CU entity that can implement a function of a specific layer in a transmit end device or a receive end device; or may be a chip, a chip system including at least one chip, or the like. This is not limited in this embodiment of this application.

In an optional embodiment, the communications apparatus may be an entity corresponding to a PDCP layer or an SDAP layer.

In one embodiment, the transmit end device and the receive end device may be the same or may be different. This is not limited in this embodiment of this application.

It should be understood that the communications apparatus 1000 may correspond to (for example, may be configured in or may be) the PDCP entity described in the foregoing method 600, and may be configured to perform actions performed by the PDCP entity in the method 1100 and various processing processes listed above. For brevity, details are not described herein again.

It should be further understood that the data transmission apparatus 1000 shown in FIG. 10 is merely an example. The communications apparatus in this embodiment of this application may further include another module or unit, may include modules having functions similar to those of the modules in FIG. 10, or may not necessarily include all the modules in FIG. 10.

Figure 11:
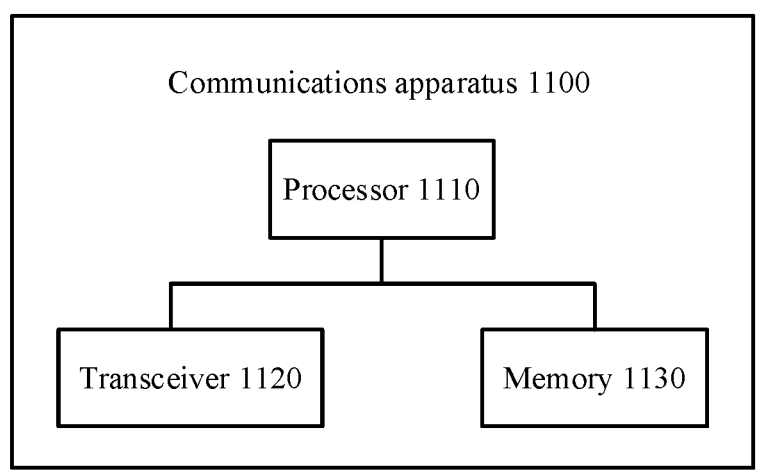
FIG. 11 is a schematic block diagram of another example of a communications apparatus according to an embodiment of this application.

FIG. 11 is a schematic block diagram of a communications apparatus 1100 according to an embodiment of this application. The communications apparatus 1100 may correspond to the communications apparatus in FIG. 8, FIG. 9, or FIG. 10. The communications apparatus 1100 may use a hardware architecture shown in FIG. 11. The apparatus may include a processor 1110, a transceiver 1120, and a memory 1130. The processor 1110, the transceiver 1120, and the memory 1130 communicate with each other through an internal connection path. Related functions implemented by the processing unit 820 in FIG. 8, the processing unit 920 in FIG. 9, or the processing unit 1020 in FIG. 10 may be implemented by the processor 1110. Related functions implemented by the transceiver unit 820 in FIG. 8, the transceiver unit 910 in FIG. 9, or the transceiver unit 1010 in FIG. 10 may be implemented by the processor 1110 by controlling the transceiver 1120.

The processor 1110 may include one or more processors, for example, include one or more central processing units (CPU). When the processor is one CPU, the CPU may be a single-core CPU or a multi-core CPU.

The transceiver 1120 is configured to: send data and/or a signal, and receive data and/or a signal. The transceiver may include a transmitter and a receiver. The transmitter is configured to send data and/or a signal, and the receiver is configured to receive data and/or a signal. It should be understood that the transceiver may be a transceiver module, a transceiver interface, or the like in a wired connection. This is not limited in this embodiment of this application.

The memory 1130 includes but is not limited to a random access memory (RAM), a read-only memory (ROM), an erasable programmable read-only memory (EPROM), and a compact disc read-only memory (CD-ROM). The memory 1130 is configured to store a related instruction and data.

The memory 1130 is configured to store program code and data of the apparatus, and may be an independent component or integrated into the processor 1110. This is not limited in this embodiment of this application.

Specifically, the processor 1110 is configured to control the transceiver to perform data transmission in the communications method 400. For details, refer to the descriptions in the embodiment of the method 400. Details are not described herein again.

Alternatively, the processor 1110 is configured to control the transceiver to perform data transmission in the communications method 500. For details, refer to the descriptions in the embodiment of the method 1000. Details are not described herein again.

Alternatively, the processor 1110 is configured to control the transceiver to perform data transmission in the communications method 600. For details, refer to the descriptions in the embodiment of the method 1100. Details are not described herein again.

It may be understood that FIG. 11 shows only a simplified design of the apparatus. During actual application, the apparatus may further include other necessary components, including but not limited to any quantity of transceivers, processors, controllers, memories, and the like, and all apparatuses that can implement this application shall fall within the protection scope of this application.

In one embodiment, the apparatus 1100 may be a chip apparatus. The chip apparatus may include at least one chip, and the chip may be a field programmable gate array, an application-specific integrated chip, a system chip, a central processing unit, a network processor, a digital signal processing circuit, or a microcontroller for implementing related functions. A programmable controller, or another integrated chip may be alternatively used. The chip may include one or more memories, configured to store program code. When the code is executed, the apparatus is enabled to implement a corresponding function.

A person of ordinary skill in the art may be aware that units and algorithm operations in the examples described with reference to the embodiments disclosed in this specification may be implemented by electronic hardware or a combination of computer software and electronic hardware. Whether the functions are performed by hardware or software depends on a particular application and a design constraint of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in another manner. For example, the described apparatus embodiments are merely examples. For example, division into the units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the operations of the methods described in the embodiments of this application. The foregoing storage medium includes any medium that can store program code, such as a USB flash drive, a removable hard disk, a read-only memory (ROM), a random access memory (RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communications method, wherein the method comprises:
    obtaining, by a media access control (MAC) entity, M radio link control (RLC) protocol data units (PDUs), wherein M is an integer greater than or equal to 2; and
    generating, by the MAC entity, N MAC PDUs based on a logical channel corresponding to each of the M RLC PDUs, wherein any two RLC PDUs corresponding to a same logical channel and having consecutive RLC sequence numbers are carried in different MAC PDUs, and N is an integer greater than or equal to 2;
    wherein an interval between MAC sequence numbers of a first MAC PDU and a second MAC PDU in the N MAC PDUs is greater than or equal to k, k is an integer greater than or equal to 2, the first MAC PDU carries a first RLC PDU on a first logical channel, the second MAC PDU carries a second RLC PDU on the first logical channel, and RLC sequence numbers of the first RLC PDU and the second RLC PDU are consecutive.

2. The method according to claim 1, wherein a third MAC PDU in the N MAC PDUs carries T RLC PDUs corresponding to a same logical channel, T is an integer greater than or equal to 2, T is less than M, an interval between RLC sequence numbers of any two of the T RLC PDUs is greater than or equal to t, and t is an integer greater than or equal to 2.

3. The method according to claim 1, wherein a third MAC PDU in the N MAC PDUs carries T RLC PDUs corresponding to a same logical channel, T is an integer greater than or equal to 2, T is less than M, an interval between RLC sequence numbers of any two of the T RLC PDUs is greater than or equal to t, and t is an integer greater than or equal to 2.

4. A communications method, wherein the method comprises:
    obtaining, by a media access control (MAC) entity, M radio link control (RLC) protocol data units (PDUs), wherein M is an integer greater than or equal to 2; and
    generating, by the MAC entity, N MAC PDUs based on a flow corresponding to each of the M RLC PDUs, wherein any two RLC PDUs corresponding to a same flow that are obtained in consecutive order are carried in different MAC PDUs, and N is an integer greater than or equal to 2;
    wherein an interval between MAC sequence numbers of a first MAC PDU and a second MAC PDU in the N MAC PDUs is greater than or equal to k, k is an integer greater than or equal to 2, the first MAC PDU carries a first RLC PDU of a first flow, the second MAC PDU carries a second RLC PDU of the first flow, and the first RLC PDU and the second RLC PDU are obtained in consecutive order.

5. The method according to claim 4, wherein a third MAC PDU in the N MAC PDUs carries T RLC PDUs corresponding to a same flow, T is an integer greater than or equal to 2, T is less than M, and any two of the T RLC PDUs are obtained in nonconsecutive order.

6. The method according to claim 4, wherein a third MAC PDU in the N MAC PDUs carries T RLC PDUs corresponding to a same flow, T is an integer greater than or equal to 2, T is less than M, and any two of the T RLC PDUs are obtained in nonconsecutive order.

7. The method according to claim 4, wherein the generating, by the MAC entity, of the N MAC PDUs based on the flow corresponding to each of the M RLC PDUs comprises:
determining, by the MAC entity based on a flow identifier carried in each RLC PDU, the flow corresponding to each of the M RLC PDUs, wherein the flow identifier is carried in a service data adaptation protocol SDAP header or a packet data convergence protocol PDCP header.

8. The method according to claim 4, wherein the generating, by the MAC entity, of the N MAC PDUs based on the flow corresponding to each of the M RLC PDUs comprises:
determining, by the MAC entity based on a flow identifier carried in each RLC PDU, the flow corresponding to each of the M RLC PDUs, wherein the flow identifier is carried in a service data adaptation protocol SDAP header or a packet data convergence protocol PDCP header.

9. The method according to claim 5, wherein the generating, by the MAC entity, of the N MAC PDUs based on the flow corresponding to each of the M RLC PDUs comprises:
determining, by the MAC entity based on a flow identifier carried in each RLC PDU, the flow corresponding to each of the M RLC PDUs, wherein the flow identifier is carried in a service data adaptation protocol SDAP header or a packet data convergence protocol PDCP header.

10. A communications apparatus, comprising:
a transceiver unit, configured to obtain M radio link control (RLC) protocol data units PDUs, wherein M is an integer greater than or equal to 2; and
a processing unit, configured to generate N media access control (MAC) protocol data units PDUs based on a logical channel corresponding to each of the M RLC PDUs, wherein any two RLC PDUs corresponding to a same logical channel and having consecutive RLC sequence numbers are carried in different MAC PDUs, and N is an integer greater than or equal to 2;
wherein an interval between MAC sequence numbers of a first MAC PDU and a second MAC PDU in the N MAC PDUs generated by the processing unit is greater than or equal to k, k is an integer greater than or equal to 2, the first MAC PDU carries a first RLC PDU on a first logical channel, the second MAC PDU carries a second RLC PDU on the first logical channel, and RLC sequence numbers of the first RLC PDU and the second RLC PDU are consecutive.

11. The apparatus according to claim 10, wherein a third MAC PDU in the N MAC PDUs generated by the processing unit carries T RLC PDUs corresponding to a same logical channel, T is an integer greater than or equal to 2, T is less than M, an interval between RLC sequence numbers of any two of the T RLC PDUs is greater than or equal to t, and t is an integer greater than or equal to 2.

12. The apparatus according to claim 10, wherein a third MAC PDU in the N MAC PDUs generated by the processing unit carries T RLC PDUs corresponding to a same logical channel, T is an integer greater than or equal to 2, T is less than M, an interval between RLC sequence numbers of any two of the T RLC PDUs is greater than or equal to t, and t is an integer greater than or equal to 2.

* * * * *